(12) United States Patent
Thornton et al.

(10) Patent No.: US 12,170,736 B2
(45) Date of Patent: Dec. 17, 2024

(54) SYSTEMS AND METHODS FOR HYBRID PHYSICAL UNCLONABLE FUNCTIONS

(71) Applicant: Anametric, Inc., Austin, TX (US)

(72) Inventors: Mitchell A. Thornton, Dallas, TX (US); Duncan L. MacFarlane, Dallas, TX (US); William V. Oxford, Austin, TX (US)

(73) Assignee: ANAMETRIC, INC., Austin, TX (US)

( * ) Notice: Subject to any disclaimer, the term of this patent is extended or adjusted under 35 U.S.C. 154(b) by 98 days.

(21) Appl. No.: 17/729,416

(22) Filed: Apr. 26, 2022

(65) Prior Publication Data
US 2022/0376934 A1    Nov. 24, 2022

Related U.S. Application Data

(60) Provisional application No. 63/180,877, filed on Apr. 28, 2021.

(51) Int. Cl.
*H04L 29/00* (2006.01)
*H04L 9/08* (2006.01)
*H04L 9/32* (2006.01)

(52) U.S. Cl.
CPC .......... *H04L 9/3278* (2013.01); *H04L 9/0852* (2013.01); *H04L 9/3247* (2013.01)

(58) Field of Classification Search
CPC .... H04L 9/3278; H04L 9/0852; H04L 9/3247
USPC ........................................................ 713/168
See application file for complete search history.

(56) References Cited

U.S. PATENT DOCUMENTS

| | | | |
|---|---|---|---|
| 2011/0069972 A1* | 3/2011 | Wiseman | H04L 9/0852 398/186 |
| 2011/0236021 A1 | 9/2011 | Presi | |
| 2015/0215115 A1* | 7/2015 | Pikus | H04L 9/3278 380/30 |
| 2017/0134174 A1 | 5/2017 | Cambou | |
| 2020/0052893 A1* | 2/2020 | Lu | H04L 9/3278 |
| 2020/0186350 A1 | 6/2020 | Wentz et al. | |

(Continued)

OTHER PUBLICATIONS

Akriotou, M., Fragkos, A., and Syvridis, D., Photonic Physical Unclonable Functions: From the Concept to Fully Functional Device Operating in the Field, arXiv:2002.12618 [cs.CR], 17 pgs., at https://arxiv.org/pdf/2002.12618.pdf, (last accessed Mar. 21, 2021).

(Continued)

*Primary Examiner* — Brandon Hoffman
*Assistant Examiner* — Michael D Anderson
(74) *Attorney, Agent, or Firm* — SPRINKLE IP LAW GROUP

(57) ABSTRACT

Embodiments of PUF systems are disclosed. Embodiments of such PUFs may be operated in the classical domain or the quantum domain, and moreover, may comprise substantially the same circuitry, and operate substantially the same, when operating in the classical domain or the quantum domain. Additionally, embodiments of such PUF systems may be effectively utilized to generate uniquely identifying signatures for electronic devices based on electronic circuity, photonic circuitry or some combination of electronic and photonic circuitry and may be utilized to generate such signatures for such electronic devices regardless of whether such electronic device themselves operate in the classical or quantum domain.

20 Claims, 10 Drawing Sheets

(56) References Cited

U.S. PATENT DOCUMENTS

| | | |
|---|---|---|
| 2022/0069990 A1 | 3/2022 | Ryckman et al. |
| 2022/0076155 A1 | 3/2022 | MacFarlane et al. |
| 2024/0223361 A1 | 7/2024 | MacFarlane et al. |

OTHER PUBLICATIONS

Bowman, Keith A., Duvall, Steven G., and Meindl, James D., Impact of Die-to-Die and Within-Die Parameter Fluctuations on the Maximum Clock Frequency Distribution for Gigascale Integration, IEEE Journal of Solid-State Circuits, vol. 37, No. 2, Feb. 2002, pp. 183-190.

Boning, Duane S., and Nassif, Sani, Models of Process Variations in Device and Interconnect, in A. Chandrakasan, W. Bowhill, and F. Fox (eds.), Design of High Performance Microprocessor Circuits, Chapter 6, IEEE Pres, 2000, 34 pgs.

Gassend, Blaise, Clarke, Dwaine, Van Dijk, Marten and Devadas, Srinivas, Silicon Physical Random Functions, in proc. ACM Conf. on Computer and Communications Security, Nov. 2002, pp. 149-160.

Huntoon, Nathan R., Christensen, Marc P., MacFarlane, Duncan L., Evans, Gary A., and Yeh, C.S., Integrated Photonic Coupler Based on Frustrated Total Internal Reflection, Applied Optics, vol. 4, No. 30, Oct. 20, 2008, pp. 5682-5690.

Korenda, Ashwija R., Afghah, Fatemeh, Cambou, Bertrand, and Philabaum, Christopher, A Proof of Concept SRAM-based Physically Unclonable Function (PUF) Key Generation Mechanism for IoT Devices, in proc. Workshop on Security, Trust, and Privacy in Emerging Cyber-Physical Systems, SECON 2019, 8 pgs.

Krishnamoorthy, Ashok V., Zheng, Xuezhe, Li, Guoliang, Yao, Jin, Pinguet, Thierry, Mekis, Attila, Thacker, Hiren, Shubin, Ivan, Luo, Ying, Raj, Kannan, and Cunningham, John E., Exploiting CMOS Manufacturing to Reduce Tuning Requirements for Resonant Optical Devices, IEEE Photonics Journal, vol. 3, No. 3, Jun. 2011, pp. 567-579.

Liu, Ke, Huang, Hui, Mu, Si Xuan, Lin, Hai, and MacFarlane, Duncan L., Ultra-compact Three-Port Trench-Based Photonic Couplers in Ion-Exchanged Glass Waveguides, Optics Communications, 309, 2013, pp. 307-312.

Majzoobi, Mehrdad, Koushanfar, Farinaz and Potkonjak, Miodrag, Lightweight Secure PUFs, in proc. IEEE/ACM International Conference on Computer-Aided Design, Nov. 2008, pp. 670-673.

Pappu, Srinivasa Ravikanth, Physical One-Way Functions, PhD Thesis, Massachusetts Institute of Technology, Mar. 2001, 154 pgs.

Rührmair, Ulrich, Hilgers, Christian, Urban, Sebastian, Weiershäuser, Agnes, Dinter, Elias, Forster, Brigette, and Jirauschek, Christian, Revisiting Optical Physical Unclonable Functions, Cryptology ePrint Archive, Report 2013/215, Apr. 2013, https://eprint.iacr.org/eprint-bin/versions.pl?entry=2013/215, last accessed Mar. 21, 2021.

Rührmair, Ulrich, Hilgers, Christian, Urban, Sebastian, Weiershäuser, Agnes, Dinter, Elias, Forster, Brigette, and Jirauschek, Christian, Optical PUFs Reloaded, Cryptology ePrint Archive, Report 2013/215, May 2013, 13 pgs. at <https://eprint.iacr.org/eprint-bin/versions.pl?entry=2013/215, last accessed Mar. 20, 2021>.

Rührmair, Ulrich, and Holcomb, Daniel E., PUFs at a Glance, in proc. Design, Automation and Test in Europe, Mar. 2014, pp. 1-6.

Simmons, Gustavus J., A System for Verifying User Identity and Authorization at Point-of-Sale or Access, Cryptologica, 8(1), 1984, pp. 1-21.

Simmons, Gustavus, Identification of Data, Devices, Documents and Individuals, in proc. IEEE International Carnahan Conference on Security Technology, 1991, pp. 197-218.

Škorić, B., The Entropy of Keys Derived from Laser Speckle; Statistical Properties of Gabor-transformed Speckle, Journal of Optics A: Pure and Applied Optics, 10(5):055304-05516, Oct. 26, 2007, 25 pgs.

Škorić, B., Bel, T., Blom, A.H.M., De Jong, B.R., Kretschman, H., and Nellissen, A.J.M., Randomized Resonators as Uniquely Identifiable Anti-counterfeiting Tags, in proc. Secure Component System Identification Workshop, Berlin, Mar. 2008, 12 pgs.

Škorić, B., Quantum Readout of Physical Unclonable Functions: Remote Authentication Without Trusted Readers and Authenticated Quantum Key Exchange Without Initial Shared Secrets, Cryptology ePrint Archive, Report 2009/369, Jul. 2009, 21 pgs. at <https://eprint.iacr.org/2009/369, (last accessed Mar. 21, 2021)>.

Sultana, N., Zhou, Wei, Lafave, Jr., Tim P. and MacFarlane, Duncan L., HBr Based ICP Etching of High Aspect Nanoscale Trenches in InP: Considerations for Photonic Applications, Journal of Vacuum Science Technology, B 27(6) Nov./Dec. 2009, pp. 2351-2356.

Thornton, Mitchell A., Introduction to Quantum Computation Reliability, in proc. IEEE International Test Conference, Nov. 2020, pp. 1-10.

Thornton, Mitchell A. and MacFarlane, Duncan L., Quantum Photonic TRNG with Dual Extractor, in proc. Workshop on Quantum Technology and Optimization Problems, Mar. 2019, 12 pgs.

Tuyls, P., Škorić, B., Stallinga, S., Akkermans, A.H.M., and Ophey, W., Information—Theoretic Security Analysis of Physical Unclonable Functions, A.S. Patrick and M. Yung (Eds.): FC 2005, LNCS 3570, pp. 141-155, 2005.

Pappu, R., Recht, B., Taylor, J., and Gershenfeld, N., Physical One-Way Functions, Science, vol. 297, 2002.

Plaga, R. and Merli, D., A New Definition and Classification of Physical Unclonable Functions, in proc. Second Workshop on Cryptography and Security in Computing Systems, Jan. 2015, pp. 7-12.

Yang, J. and Chen, L., A New Loadless 4-Transistor SRAM Cell with a 0.18μm CMOS Technology, in proc. Canadian Conference on Electrical and Computer Engineering, 2007, pp. 538-541.

Shichman, H. and Hodges, D., Modeling and Simulation of Insulated-Gate Field Effect Transistor Switching Circuits, IEEE Journal of Solid-State Circuits, SC-3, Sep. 1968, pp. 285-289.

Zhou, W., Sultana, N., and MacFarlane, D.L., HBr-Based Inductively Coupled Plasma Etching of High Aspect Ratio Nanoscale Trenches in GaInAsP/InP, Journal of Vacuum Science Technology, B 26(6), Nov./Dec. 2008, pp. 1896-1902.

Sharma, M. and Arora, N., OPTIMA: A Nonlinear Model Extraction Program with Statistical Confidence Region Algorithms, IEEE Transactions on CAD, 12(7), Aug. 1993, pp. 982-987.

International Search Report and Written Opinion for International Patent Application No. PCT/US22/26304, dated Aug. 2, 2022, 7 pgs.

International Preliminary Report on Patentability issued by the International Bureau of WIPO for International Patent Application No. PCT/US22/26304, mailed Nov. 9, 2023, 6 pages.

International Search Report and Written Opinion issued by the U.S. Patent Office as the International Searching Authority (USPTO/ISA) for International Patent Application No. PCT/US23/29359, mailed Nov. 8, 2023, 7 pages.

* cited by examiner

SYSTEMS AND METHODS FOR HYBRID PHYSICAL UNCLONABLE FUNCTIONS

RELATED APPLICATIONS

This application claims a benefit of priority under 35 U.S.C. § 119 to U.S. Provisional Patent Application No. 63/180,877 filed Apr. 28, 2021, entitled "Systems and Methods For Hybrid Quantum PUF Construction", by Mitchell A. Thornton et al., which is hereby fully incorporated by reference in its entirety.

TECHNICAL FIELD

This disclosure relates generally to security of computing devices. In particular, this disclosure related to the authentication of electronic devices and system. More specifically, this disclosure relates to Physical Unclonable Functions (PUFs). Even more specifically, this disclosure relates to PUFs that are adapted for operation in a quantum domain or operation in a classical domain.

BACKGROUND

A Physical Unclonable Function (PUF) is a structure that can serve as a unique, unforgeable identifier (ID) for purposes of verifying the authenticity of a device or object. A PUF may thus, for example, perform a similar function as a serial number for a given device, but with the added requirement that the value of a PUF can never be copied, even if its value is provably correct. For a PUF, then, this unique identification thus has two main characteristics: 1) it is nearly impossible to duplicate, due to the details of its construction and 2) it is able to be queried in a way that can reliably and safely establish the identity of the object that possesses the ID.

The recent massive proliferation of connected devices (the "Internet of Things" or "IoT") has put an increasing emphasis on the ability to robustly distinguish between many otherwise identical units. Concurrently, this proliferation of devices has also created significant downward pressure on their production cost and deployment overhead. These overhead factors include not only raw distribution costs, but also the supplemental circuitry required to implement them, the operational cycle time required to reliably establish a secure unique ID, and finally, the overall production time—which includes any per-device provisioning steps required as well as the raw device manufacture. These time and cost pressures increase the already-difficult job of providing for robust security. Additionally, because these devices are all interconnected, there is the additional proviso that the device(s) to be uniquely and securely identified may not necessarily be available for direct physical inspection. These requirements are nearly all mutually antagonistic, but it is highly desirable to address all of them, among others, simultaneously.

Accordingly, there is a need to for systems and methods for improved PUFs.

SUMMARY

Some additional context with respect to PUFs and their utilization may be useful. A PUF may be used to securely, and uniquely, identify electronic devices through generation of a signature. Accordingly, perhaps the most important attribute of a PUF (e.g., the root of the host device's signature) is its uniqueness. At the same time, such a unique ID should be protected from discovery by an adversary (typically by use of a secure verification protocol). A basic procedure of verifying a PUF value (and thus, verifying the unique identity of the device that hosts that PUF) is thus embedded into an interactive, transactional mechanism usually referred to as a "challenge-response" protocol (CRP).

In many cases it is desirable that a truly secure PUF system has certain characteristics. These characteristics include; that the devices in question exhibit a nearly-uniform PUF value probability distribution function (pdf) among the community of all such devices; that challenges (for the CRP) employ unpredictable nonce values or other means to prevent repeatability in the responses; that a mapping from the challenge domain to the corresponding response co-domain be accomplished by a sufficiently strong one-way function; that there exists an unambiguous method of verifying the authenticity of a respondent, and that the PUF value (i.e., the root value from which a signature may be derived) must be safe from discovery, even under direct physical inspection (e.g., including complete disassembly).

The ability to implement a PUF that meets such criteria may, however, be quite difficult. One particular impediment to implementing such PUF is the variation between the type of circuitry used to implement computing devices and additionally, how such circuits are operated. For instance, computing devices may include electronic circuits or photonic (also referred to as optical) circuits (or some combination of electronic and optical circuits). Furthermore, such circuits may be operated in the classical domain (e.g., according to the principles of classical operation, also referred to as classical mode) or in a quantum domain (e.g., according to the principles of quantum mechanical operation, also referred to as quantum mode). Thus, it would be extremely desirable to use a PUF generation means (e.g., PUF circuit) that could potentially be used within circuits that are either wholly or in part comprised of photonic circuitry, where that same PUF circuit may be operated in either the classical domain or the quantum domain, and moreover, may comprise substantially the same circuitry, and operate with substantially similar characteristics, when operating in the classical domain or the quantum domain.

To those ends, among others, attention is now directed to embodiments of such a hybrid PUF. The term "hybrid" us used herein to indicate that the same PUF system can be operated in either the quantum domain or the classical domain (or some mixture of both). An embodiment of such a PUF system may generate a signature of a particular bit width (e.g., a number of bits), where each bit of the PUF value can be generated utilizing a component chain including at least one optical component. Thus, one embodiment of such a PUF circuit may have a photonic source, such as a pump laser (e.g., for operation of the PUF in the classical domain) or a single-photon source (e.g., for operation of the PUF in the quantum domain) coupled to the respective component chain associated with that bit. In PUF circuits that contain multiple output bits (i.e. output vectors), these individual circuits may be interconnected in such a way that the output vector bits may be either generated independently or in such a way that the output bits of the output vector may be mutually dependent. In both cases, based on one or more photons generated from the photon source, the component chain may generate either a single-bit or a vector (multi-bit) output. The value for each of the bits of the signature of the PUF can then be determined based on the internal PUF value combined with the structure of the output component chain.

In the case where the structure of the output component chain is logically identical in all devices, then the "identity"

of the device may therefore be contained entirely within the internal PUF value. Alternately, this PUF value may be distributed within the output component chain circuitry, where minute variations in that circuitry can result in distinctly different output values, in the case where the internal "seed" value may be identical between different devices. Both of these cases are contemplated in this invention.

According to embodiments, the chain (e.g., one or more) of components (e.g., hardware or physical implementation of a function which include, for example photonic or electrical circuits) utilized to generate the bits of the signature for the PUF may thus be identical in design and intended function. However, each of these component chains (e.g., and each individual component of the chain) may have variations. These variations may be introduced intentionally or unintentionally (or both); intentionally, through a design of the component (e.g., a design that introduces variation to the component while keeping the intended functionality the same) or unintentionally, as, for example, variations introduced through the manufacturing process or by related tolerances of the component circuitry.

By combining a set of these circuit elements in a chain comprising multiple cascaded components, the variation between different instances of those chains of components may be magnified. Namely, despite different instances of the chain of circuit elements comprising identical components chained in the same manner, and having exactly the same designed functionality (e.g., if the variations are disregarded), these circuit element chains will exhibit increased variation (e.g., relative to one another or relative to a use of a single component) in operation by virtue of the chaining of the set of circuit elements, as each component in the chain introduces additional variation, or compounds the variations introduced by the components upstream in the circuit elements chain, through its own inherent variation. Thus, a bit of the signature generated by the PUF using one component chain may differ (or be the same as) another bit of the signature generated by the PUF using a different chain due to the variability introduced by the individual components that make up each chain, despite the fact the component chains may be identical in design (e.g., include the same type of circuit elements coupled in the same manner).

Specifically, according to one embodiment, a chain of photonic (i.e., optical) circuit elements may be utilized as a component chain in such a PUF, where the photonic circuit elements may be coupled to one another to provide a photonic path. In but one example, a chain of optical circuit elements may include a splitter and one or more (optical) couplers (e.g., a 4-port coupler, such as a 90/10, 50/50, etc. 4-port coupler). In a specific embodiment, a first component of the circuit chain may be a Y splitter, each output of the Y splitter may be coupled to a respective input of a 4-port coupler where each output of that 4-port coupler is, in turn, coupled to a respective input of another 4-port coupler.

In one embodiment, for each output bit of the PUF device, such a circuit chain may be utilized in generating that respective bit. In particular, an identical optical component chain of this type may be utilized for each bit of a PUF having a particular bit width (e.g., a 4 bit PUF will have four component chains, etc.). Alternately, a 4-bit PUF may have only one internal "seed" value per PUF device, but may still have a multi-bit (vector) output, due to the operation of the circuit element chain that produces the externally-visible PUF output (i.e., the signature). In both of these embodiments, a photon source (e.g., for that respective bit) may be coupled to the input of the first component of the circuit element chain (e.g., the input of a Y splitter). Each output of the final component of the component chain (e.g., the outputs of the 4-port coupler) may then be coupled to a respective photodetector. The output of each of the photodetectors may, in turn, be coupled to a respective input of one or more corresponding differential amplifiers.

Thus, when a photon is generated by the photon source, the photon may then travel through the associated optical component chain coupled to that photon source. The path the photon takes through the component chain is determined not only by the design of the (e.g., optical) circuit element chain, but additionally by the variation of each component of the associated circuit element chain. The presence, absence (or amount) of photonic energy on each output of the final component of the component chain (e.g., the 4-port coupler) may then be detected (or not detected) by a corresponding photodetector coupled to each output of the final component of the component chain (e.g., the 4-port coupler). The signal output produced by each of these photodetectors may then be provided to an input of one or more differential amplifiers coupled to each of the photodetectors. The differential amplifier may then take a difference of the two input signals such that the output of the differential amplifier corresponds to the value of one bit of the output (signature) of the PUF device. It will be noted that in some embodiments the output of a differential amplifier may be coupled to additional circuitry or components to facilitate the use of that output signal in other circuitry (e.g., such as challenge and response circuitry). This additional circuitry may include, for example, level shifting or thresholding circuitry that may increase (or decrease) a logical level or voltage domain of the output of the differential amplifier such that the signal can be utilized by downstream electronic circuitry.

Particular embodiments of a PUF system may also include challenge and response logic (circuitry) that allows a response (e.g. a set of bits or a signature) to a challenge (e.g., a different set of bits) to be generated based on the unique characteristics embedded in the structure of the PUF. The challenge and response may, for example, be a word (or vector) with the same bit width as the signature generated. In one embodiment, this challenge and response logic may take as input each bit of the internally-generated unique value generated by the PUF circuit. It may also take a fixed input value (that may be pre-provisioned to the PUF device) and then send that fixed input value through the PUF circuitry to produce a unique output for that PUF circuit. In either case, that unique PUF value can then be detected at the output of the differential amplifier (or thresholding logic), which may then be coupled to an inverter and one input of an SR latch, as shown in the exemplary structure shown in FIGS. 8A and 8B. In that example, each output of the SR latch is then coupled to a respective 2-1 multiplexer. The select signal of the multiplexer may be coupled to a register or other type of memory which may have the challenge loaded therein. The multiplexer can thus be selected by the value of a respective bit (e.g., or the entirety of) the challenge value (e.g., as contained in the register). The output of the multiplexer thus comprises the value of a bit the response and can be stored in a register for returning in response to the received challenge. In some cases, therefore, embodiments of the challenge response circuitry will be adapted to provide $2^n$ responses to a challenge value of n bits. Moreover, permutation circuitry as is known in the art may be added to embodiments of the challenge and response logic as disclosed to enable a greater range of responses (e.g., by adding permutation circuitry $2^{2^n}$ response to a challenge value of n bits may be achieved.

Thus, embodiments of PUF systems, including embodiments of PUFs as described, may include a chain of components including at least one optical component that increase the variation present in such a PUF circuit, such circuits may be operated (e.g., to exploit such variations) in the classical domain and the quantum domain, and moreover, may comprise substantially the same circuitry, and operate substantially the same, when operating in the classical domain or the quantum domain. Additionally, such PUF systems may be effectively utilized to generate uniquely identifying signatures for electronic devices based on electronic circuitry, photonic circuitry or some combination of electronic and photonic circuitry and may be utilized to generate such signatures for such electronic devices regardless of whether such electronic device themselves operate in the classical or quantum domain. Because of these characteristics embodiments of the PUFs and PUF systems disclosed herein may substantially serve as a "universal" PUF or PUF system that may be utilized with a wide variety of computing circuitry (e.g., electronic or optical) and operated in a plurality of computing domains (e.g., classical or quantum). Thus, PUF systems as disclosed can be adapted to operate in the quantum mode or the classical mode to give a unique signature (e.g., uniquely identifying) for a quantum circuit or a classical circuit.

In certain embodiments, a hybrid PUF system may include a PUF adapted to generate a unique signature associated with the PUF system, wherein the signature has one or more bits of output. The PUF may comprise a photon source and a component chain. The component chain may have an input coupled to the photon source and an output. The component chain comprises a plurality of coupled optical components, wherein a value for a bit of the bit width of the signature of the PUF is based on the output of the component chain.

In an embodiment, the PUF further comprises a photodetector coupled to the output of the component chain, wherein the value for the bit of the bit width of the signature of the PUF is based on the output of the photodetector.

In some embodiments, the PUF comprises the photon source, the component chain, and the photodetector for each bit of the bit width of the signature.

In a particular embodiment, the component chain is adapted to operate as a splitter, which may be, for example, a 3 db splitter.

In one embodiment, the component chain is a composite splitter comprising a Y splitter, a first 4-port coupler coupled to an output of the Y splitter, and a second 4-port coupler coupled to an output of the first 4-port coupler.

In an embodiment, the output of the component chain comprises a first output and a second output and the photodetector comprises a first photodetector coupled to the first output of the component chain and a second photodetector coupled to the second output of the component chain. The PUF can further include a differential amplifier having a first input coupled to an output of the first photodetector and a second input coupled to an output of the second photodetector, wherein the bit value for the bit of the bit width of the signature of the PUF is based on an output of the differential amplifier.

In specific embodiments, the photon source comprises a pump laser and the hybrid PUF system is adapted to operate a classical domain or the photon source comprises a single photon source and the hybrid PUF system is adapted to operate in a quantum domain.

In one embodiment, the PUF system further comprises challenge and response logic adapted to determine a response to a challenge, wherein a value of the response is based on a value of the signature generated by the PUF and a value of the challenge.

In a particular embodiment, the challenge and response logic comprises electronic circuitry.

In some embodiments, the challenge and response logic comprises an inverter with an input coupled to the an output of the differential amplifier; a SR latch having a first input coupled to an output of the inverter and a second input coupled to the output of the differential amplifier; and a multiplexer having a first input coupled to a first output of the SR latch and a second input coupled to a second output of the SR latch, wherein the multiplexer is adapted to be selected based on the value of the challenge and the value of a bit of the response is based on an output of the multiplexer.

In one embodiment, the challenge and response logic comprises the inverter, the SR latch, and the multiplexer for each bit of a bit width of the response. The bit width of the response may, for example, be the same as the bit width of the signature. Moreover, in some cases the multiplexer is adapted to be selected based on the value of a corresponding respective bit of the challenge value.

In another embodiment, the PUF system comprises level shifting logic disposed between the output of the differential amplifier and the input of the inverter and between the output of the differential amplifier and the SR latch.

In one embodiment, a method may comprise generating a unique signature associated with a system, wherein the signature has a bit width, by: producing a photon from a photon source; providing the photon to a component chain, the component chain having a plurality of coupled optical components; and determining a value for a bit of the bit width of the unique signature based on the output of the component chain.

In certain embodiments, the component chain is a composite splitter comprising a Y splitter, a first 4-port coupler coupled to an output of the Y splitter, and a second 4-port coupler coupled to an output of the first 4-port coupler.

In one embodiment, the output of the component chain comprises a first output and a second output and a first photodetector is coupled to the first output of the component chain and a second photodetector is coupled to the second output of the component chain, and the value for the bit of the bit width of the unique signature is determined by taking a difference between an output of the first photodetector and an output of the second photo detector.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
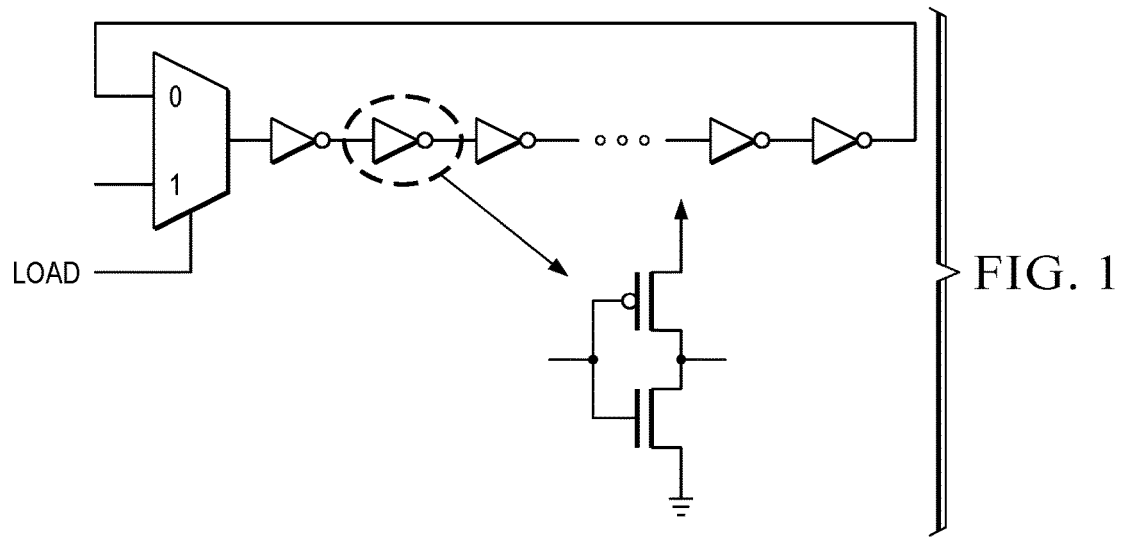
FIG. 1 is a block diagram of a delay-based PUF.

The disclosure and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in detail, it may be helpful to give a general overview of certain aspects pertaining to embodiments. As may be recalled from the above discussion, it is increasingly desirable to be able to securely, and uniquely, identify electronic devices. A PUF is one way to address such desires. Accordingly, perhaps the most important attribute of a PUF is its uniqueness. In other words, how many distinct items with the same basic structure (e.g., circuitry) can be reliably distinguished from each other. Establishing a unique identity where one object is functionally identical to many others, but can nevertheless be distinguished from these other devices is a difficult task. At the same time, such a unique ID should be protected from discovery by an adversary. This last task has been made much harder of late due to the proliferation of Machine Learning (ML)-based adversaries, who are able to harness the power of statistics over very large data sets to unearth patterns that are not readily discernable to humans. For this reason, the basic procedure of verifying a PUF value (and thus, verifying the unique identity of the device that hosts that PUF) must, by necessity in many instances, be embedded into an interactive, transactional mechanism.

This transactional process is accomplished by two-way communications in a "challenge-response" protocol (CRP). The challenger (who wishes to verify the identity of the device in question) issues a query to the respondent (device), which then replies with a response message that can be uniquely verified to "prove" its identity in some way. Usually, this CRP protocol begins with a message that contains a random number (called a "nonce"). This nonce is necessary in order to prevent replay attacks. If the nonce is not entirely random (i.e., if it is predictable, even to a small extent), then an attacker can pre-compute collections of potential response messages ahead of time. This ability to create a collection of potential responses reduces the search space of an attacker, which can result in a statistically significant amount of information regarding what the PUF value might be to be gleaned from any observed message traffic to and from the device in question. After some number of legitimate challenge-response message pairs, an ML-based adversary may be able to successfully impersonate the legitimate device to some other challenger. In some cases, it has been shown that as few as a dozen authentic CRP transactions are enough to allow an ML-based adversary to successfully impersonate an authentic device.

The ability to discern statistically relevant information from an authentic device's CRP messages (e.g., to break the security conferred by a PUF or CRP using a PUF) depends not only on the nature of the nonces used in the challenge messages, but also on the statistical distribution of the authentic devices' PUF values themselves (upon which the devices' response messages are based). If the PUF values have a statistical distribution that exhibits "clustering", then the same statistical inferences can be made as previously mentioned. In other words, if the PUF value probability distribution function (PDF) is not roughly uniform over the whole potential set of PUF values produced by the PUF or a response using the PUF, then its probable value may be predicted, given enough legitimate message data.

Another aspect of a PUF-based CRP that is critical, from a security perspective, is the nature of the function that is used to map from the PUF challenge domain to the response co-domain (or image). This function mapping should be essentially non-reversible. If it is not so, then an attacker can simply observe a single legitimate CRP exchange and use that information to determine the PUF value by reversing the mapping function from the image back to the PUF value domain. This kind of function is typically referred to as a "one-way function". Another use of such a one-way function could be for the purposes of output "whitening". If the PUF's PDF is not bunched, but is nonetheless not uniform (e.g. a binomially distributed PDF), then the final output can be made roughly uniform by using a one-way function, such as a simple hash function.

One final aspect of a viable PUF technology is that of non-discoverability, even under the face of direct physical inspection. In other words, if an adversary is able to disassemble a device containing a PUF, then that adversary should not be able to determine the PUF's innate value even if it is able to take the device apart (down to the lowest level).

As can be seen then, it is desirable that a secure PUF system exhibits the following five requisite attributes:

1) The set of devices in question must exhibit a nearly-uniform PUF value PDF,
2) All challenges must employ completely unpredictable nonce values,
3) The mapping from the challenge domain to the corresponding response co-domain must be accomplished by a sufficiently strong one-way function,
4) There must exist an unambiguous method of verifying the authenticity of a respondent, and 5) The PUF value must be safe from discovery, even under direct physical inspection (including complete disassembly).

Finally, to aid in the viability of entities to implement such a successful PUF technology, it may also be desirable that (in addition to the five features listed above), a PUF device be low cost, low overhead, have repeatability/stability, and be robust.

The ability to implement a PUF that meets such criteria may, however, be quite difficult. One particular impediment to implementing such PUF is the variation between the type of circuitry used to implement computing devices and additionally, how such circuits are operated. For instance, computing devices may include electronic circuits or photonic (also referred to as optical) circuits (or some combination of electronic of optical circuits), and such circuits may be operated in the classical domain (e.g., according to the principles of classical computing, also referred to as classical mode) or in a quantum domain (e.g., according to the principles of quantum mechanics, also referred to as quantum mode). Thus, it would be extremely desirable to have a PUF generation means (e.g., PUF circuit) that could be (in addition to other applications) used with circuits that includes (or are wholly comprised of) photonic circuitry, where that same PUF circuit may be operated in either the classical domain or the quantum domain, and moreover, may comprise substantially the same circuitry, and operate substantially the same, when operating in the classical domain or the quantum domain.

Attention is now directed to embodiments of such a hybrid (e.g., can be operated in the quantum domain or the classical domain) PUF system. An embodiment of a PUF of such a PUF system may generate a signature of a particular bit width (e.g., a number of bits), where each bit of the bit width of the PUF can be generated utilizing a component chain including at least one optical component. Thus, for a bit of the bit width of the signature, one embodiment of a PUF may have a photon source such as a photon pump (e.g., for operation of the PUF in the classical domain) or a single photon source (e.g., for operation of the PUF in the quantum domain) coupled to the respective component chain associated with that bit. Based on one or more photons generated from the photon source, the component chain may generate an output. The value for that bit of the signature of the PUF can then be determined based on the output of the component chain.

According to embodiments, the chain (e.g., one or more) of components (e.g., hardware or physical implementation of a function which include, for example photonic or electrical circuits) utilized to generate the bits of the signature for the PUF may thus be identical in design and intended function. However, each of these component chains (e.g., and each individual component of the chain) may have variations. These variations may be introduced intentionally or unintentionally (or both); intentionally through a design of the component (e.g., a design that introduces variation to the component while keeping the intended functionality the same) or unintentionally by, for example, variation introduced through the manufacturing process or related tolerances of the component.

By chaining a set of these components in a chain of components comprising multiple components, the variation between different instances of those chains of components may be magnified. Namely, despite different instances of the chain of components comprising identical types of circuits chained in the same manner, and having exactly the same designed functionality (e.g., if the variations are disregarded), these component chains will exhibit increased variation (e.g., relative to one another or relative to a use of a single component) in operation by virtue of the chaining of the set of components, as each component in the chain introduces additional variation, or compounds the variations introduced by the components upstream in the component chain, through its own inherent variation. Thus, a bit of the signature generated by the PUF using one component chain may differ (or be the same as) another bit of the signature generated by the PUF using a different component chain due to the variability introduced by the component chain, despite the fact the component chains may be identical in design (e.g., include the same type of components coupled in the same manner).

Specifically, according to one embodiment, a chain of photonic (i.e. optical) components may be utilized as a component chain in such a PUF, where the photonic components may be coupled to one another to provide a photonic path. As but one example, a chain of optical components may include a splitter and one or more (optical) couplers (e.g., a 4-port coupler, such as a 90/10, 50/50, etc. 4-port coupler). In a specific embodiment, a first component of the component chain may be a Y splitter, each output of the Y splitter may be coupled to a respective input of a 4-port coupler where each output of that 4-port coupler is, in turn, coupled to a respective input of another 4-port coupler.

In one embodiment, then for each bit of the bit width of a PUF, such a component chain may be utilized in generating that respective bit. In particular, an identical optical component chain of this type may be utilized for each bit of a PUF having a particular bit width (e.g., a 4 bit PUF will have four component chains, etc.). In this type of embodiment, a photon source (e.g., for that respective bit) may be coupled to the input of the first component of the component chain (e.g., input of the Y splitter). Each output of the final component of the component chain (e.g., the outputs of the 4-port coupler) is coupled to a respective photodetector. The output of each of the photodetectors is, in turn, coupled to a respective input of a corresponding differential amplifier.

Thus, when a photon is generated by the photon source, the photon will travel through the associated optical component chain coupled to that photon source. The path the photon take through the component chain is determined not only by the design of the (e.g., optical) component chain, but additionally by the variation of each component of the component chain. The presence, absence (or amount) of photonic energy on each output of the final component of the component chain (e.g., the 4-port coupler) can then be detected (or not detected) by the respective photodetector coupled to each output of the final component of the component chain (e.g., the 4-port coupler). The signal output by each of these photodetectors is then provided to an input of the differential amplifier coupled to each of the photodetectors. The differential amplifier produces a difference of the two input signals such that the output of the differential amplifier corresponds to the value of that bit of the signature of the PUF. It will be noted that in some embodiments the output of the differential amplifier may be coupled to additional circuitry or components to facilitate the use of that output signal in other circuitry (e.g., such as challenge and response circuitry). This additional circuitry may include, for example, level shifting or thresholding circuitry that may increase (or decrease) a logical level or voltage domain of the output of the differential amplifier such that the signal can be utilized by downstream circuitry or component.

Particular embodiments of a PUF system may also include challenge and response logic (circuitry) that allows a response (e.g. a set of bits) to a challenge (e.g., a set of bits) to be generated based on the signature generated by the PUF. The challenge and response may, for example, be the same bit width as the signature generated. In one embodiment, this challenge and response logic may take as input each bit of the signature generated by the PUF (e.g., the output of the differential amplifier or level adjustment or thresholding logic coupled to the output of the differential amplifier). The output of the differential amplifier (or thresholding logic) is coupled to an inverter and one input of an SR latch. Each output of the SR latch is coupled to a respective 2-1 multiplexer. The select signal of the multiplexer may be coupled to a register or other type of memory which may have the challenge loaded therein. The multiplexer can thus be selected by the value of a respective bit (e.g., or the entirety of) the challenge value (e.g., as contained in the register). The output of the multiplexer thus comprises the value of a bit the response and can be stored in a register for returning in response to the received challenge. In some cases, therefore, embodiments of the challenge response circuitry will be adapted to provide $2^n$ responses to a challenge value of n bits. Moreover, permutation circuitry as is known in the art may be added to embodiments of the challenge and response logic as disclosed to enable a greater range of responses (e.g., by adding permutation circuitry $2^{2^n}$ response to a challenge value of n bits may be achieved).

Thus, embodiments of PUF systems, including embodiments of PUFs as described, may include a chain of components including at least one optical component that increase the variation preset in such a PUF circuit, such circuits may be operated (e.g., to exploit such variations) in the classical domain and the quantum domain, and moreover, may comprise substantially the same circuitry, and operate substantially the same, when operating in the classical domain or the quantum domain. Additionally, such PUF systems may be effectively utilized to generate uniquely identifying signatures for electronic devices based on electronic circuitry, photonic circuitry or some combination of electronic and photonic circuitry and may be utilized to generate such signatures for such electronic devices regardless of whether such electronic device themselves operate in the classical or quantum domain. Because of these characteristics embodiments of the PUFs and PUF systems disclosed herein may substantially serve as a "universal" PUF or PUF system that may be utilized with a wide variety of computing circuitry (e.g., electronic or optical) and operated in a plurality of computing domains (e.g., classical or quantum).

It may now be helpful to give some more information related to embodiments as described herein. Many cryptographic primitives rely upon mathematical functions implemented in hardware or software that can be classified as a "one-way" function. A one-way function is one that is very easy and efficient to evaluate yet very computationally difficult to invert. The use of one-way functions in cryptographic applications is not new with early examples of such functions being implemented as one-way pads. Formal definitions of one-way functions follow.

A One-Way Function can be defined as a mathematical function implemented such that computation of the domain has very low computational complexity requirements given co-domain values, but for which mathematical inversion, or computation of co-domain values given domain values has a very high computational complexity.

Additionally, definitions of "strong one-way functions" and "weak one-way functions" based upon computational complexity arguments can be provided. A one-way function is of the form $f: \mathbb{B}^n \to \mathbb{B}^n$ where $\mathbb{B} = \{0,1\}$, is said to be "strong" if the following two conditions hold:

$f$ is easy to compute in the sense that there exists an algorithm with a computational complexity that does not exceed polynomial time.

$f$ is hard to invert in the sense that there may exist an algorithm A capable of computing the inverse function $f^{-1}$ wherein the computational complexity of A has at least exponential time complexity.

A one-way function is of the form $f: \mathbb{B}^m \to \mathbb{B}^n$ where $\mathbb{B} = \{0,1\}$, is said to be "weak" if the following two conditions hold:

$f$ is easy to compute in the sense that there exists an algorithm with a computational complexity that does not exceed polynomial time.

$f$ is hard to invert in the sense that there may exist an algorithm A capable of computing the inverse function $f^{-1}$ wherein the computational complexity of A has no more than polynomial time complexity.

The above definitions for strong and weak one-way functions assume that the algorithm A for computing the inverse function is known or that it can be found. It is possible to employ a weak one-way function for a PUF if the process for determining the algorithm A is itself of high computational complexity. However, it is generally the case that weak one-way functions should be avoided for PUF implementations.

Furthermore, these definitions provide insight into the desirability of using quantum computational methods for PUF implementations since quantum computations do not follow the Turing paradigm of computation and can thus satisfy the complexity requirements given in the above definitions. The inherent subjective probability properties present in quantum state measurements offer an attractive means to define strong one-way functions. Unfortunately, this same property due to subjective probability characteristics, causes the implementation and use of quantum computational properties as a basis for a PUF to be very challenging. This latter observation is at least one the basis for development of embodiments of a (e.g., hybrid) PUF since the possibility of using a hybrid approach can enable the exploitation of the quantum properties for developing a strong one-way function but also to avoid some of the significant challenges that are present.

One-way functions may be implemented based on physical phenomena known as "physical one-way functions" or, they may be implemented as non-physically defined mathematical functions, such as a software specification. There are many examples of non-physical one-way functions in cryptography and other cyber security applications. They are widely used to generate temporary first-time passwords and session keys for symmetric ciphers. An example application is the use of such functions to implement a cryptographic hash. Cryptographic hash signatures may then be used as authenticating signatures that accompany data files. Additionally, such one-way functions are commonly employed within encryption protocols such as RSA.

Significant effort is required to design and validate one-way functions for these use-cases. For example, it is often desirable that the accumulation of such function values have properties that cause them to be difficult to classify as either a deterministic function or an equally-likely random bit stream. It is a common goal for one-way functions in security applications to be as close to a mathematical bijection as possible if they are not perfectly bijective. This criterion is easy to appreciate since, in the example of a cryptographic hash, it would be desirable to avoid so-called "collisions" where two different keys yield the same hash signature. In fact, the identification of a collision pair for a given cryptographic hash is often considered sufficient to "break" the hash and thus cause it to lose its security value.

Another commonly desired feature of a one-way function employed for cyber security applications is that it obeys the so-called "avalanche criterion." The avalanche criterion is one where a small change in the function's domain values results in a large change in the corresponding codomain values. The avalanche criterion is generally considered to be the quantitative property where any pair of function codomain values differs by at least half of the bits they comprise when the corresponding domain values have a Hamming difference of unity. In a more formal statement of this property, let $h[w_1,w_2]$ denote the Hamming distance function for two m-bit words. If the one-way function is of the form $f: \mathbb{B}^m \to \mathbb{B}^n$, then if all possible pairs of m-bit domain words, $w_A$ and $w_B$, that have the property $h[w_A,w_B]=1$ correspond to n-bit codomain words with the property $$\lfloor h[f(w_A), f(w_B)]\rfloor \geq \frac{n}{2},$$

the function $f$ is said to satisfy the avalanche criterion.

Mathematically, a PUF refers to a physical one-way function, $f_{PUF}(d_i)$, defined over a collection of hardware implementations $\{d_1,d_2,d_3, \ldots, d_k\}$ wherein each implementation, $d_i$, yields a repeatable characterizing value, $f_{PUF}(d_i)$, referred to as a "signature." One of the first uses of the term "physically unclonable function" (PUF) appears in [GC+:02] where several different forms of electronic circuit PUFs were proposed and realized with FPGA circuitry. Some of the first notions of the concept of a PUF are generally attributed to [Bau:83][Sim:84][Sim:91]. Ideally, the signature can be considered as analogous to a unique "fingerprint" for a device that is typically in the form of a bitstring. PUF signatures are useful in a variety of security applications such as hardware device authentication, counterfeit detection, and anti-tamper applications. Most modern PUF implementations include a challenge/response mechanism wherein each of the devices $d_i$ implements a PUF function yielding a signature or response word, $r_j$, defined as $r_j=f_{PUF}(d_i,c_1)$ where $c_j$ is an interrogating challenge value. Incorporation of the challenge/response mechanism effectively allows each device to comprise a collection of different signatures, $r_j=f_{PUF}(d_i,c_j)$, depending upon which particular challenge word $c_j$ is used during a PUF interrogation. Challenge/response PUFs usually offer greater security due to a decreased probability of a signature collisions over a collection of devices.

While a PUF may be defined in terms of a collection of systems or devices, $\{d_1,d_2,d_3, \ldots, d_k\}$, for the purposes of this application, a more general definition of a PUF that is inspired by [PM:15] may also be adopted. A Physically Unclonable Function (PUF) can thus be thought of as a physical (e.g., information-storage) system that is protected by a security mechanism with the objective of rendering the system very difficult to duplicate or reverse engineer and that is meant to remain effective against an active attacker that may have temporary or permanent physical access to the module hosting the security mechanism in its original form.

Because PUFs are physically implemented, typically as circuitry rather than a programmed and user-defined function, in the ideal case they are instances of one-way functions implemented via the exploitation of physical properties. This class of one-way functions is based upon some property or state of a physical system with the important concept that the resulting signatures are repeatable and unique for a given device. An analogous idea is the unique patterns one finds in individual snowflakes. While all snowflakes are formed through a common set of circumstances in the atmosphere resulting in the condition of producing snowfall, close scrutinization of each snowflake reveals that they appear to be made of different patterns of ice crystals. Furthermore, the probability that any two snowflakes have exactly the same structure is very small. Thus, a snowflake's structure could be used as a representation of its' signature. The snowflake's signature is repeatable since each subsequent examination of the same snowflake results in observing the same pattern (assuming it has not melted). Two or more snowflakes can be differentiated from one another based upon their unique signatures. That is, probabilities of signature collisions among any two snowflakes are very small. Unique will thus be taken to mean for purposes of this disclosure mean the probability of finding another (e.g. the same signature produced by another device) is very small, not that it is the only one.

For PUFs implemented in classical electronics, it is generally the consensus that a PUF should be based upon a non-linear characteristic present within the variations of a physical structure that is being exploited to produce a physical one-way function. This condition is easy to understand since the ability to predict a PUF response could be modeled as an error present within a deterministic function. Taking this viewpoint, a wide variety of well-known error detection and correction protocols could then be employed to "correct" the error given a previously observed collection of challenge/response pairs from the PUF thus defeating the security of the PUF. Another point of view is to consider the use of a simple linear feedback shift register (LFSR) as a PUF. If a maximal sequence LFSR with a state space of size $2^n-1$ were to be employed as a PUF (i.e., this is a bad idea), then observing 2n challenge/response pairs and applying the well-known Berlekamp-Massey Theorem would enable a complete characterization of the LFSR primitive polynomial thus rendering the PUF to be completely predictable [Ber: 68]. Constructing a PUF to be based upon a non-linear physical one-way function largely relieves the concern that such reverse-engineering methods based upon can be applied to re-construct the PUF based on a few observations of challenge/response pairs by exploiting assumed linear models.

In consideration of quantum-mode PUFs, one example that motivates the use of non-linear phenomena for physical one-way functions is to consider Grover's search algorithm. A simple technique that may be considered for inverting a quantum one-way function is to employ Grover's method to search for one-way function co-domain/domain pairs. To implement this technique, an oracle must be constructed that indicates if a guess or estimate of such a pair is indeed correct. Since such oracles are based on the linear algebraic framework of quantum mechanics, determining and implementing an oracle based on non-linear phenomena is very difficult and would likely require observation of an exponential number of one-way function co-domain/domain pairs before an approximate oracle could even be formulated.

In electronic circuits, it may be necessary to identify a characteristic that can be used as a one-way function or signature. The signatures should be repeatable and unchanging for a given circuit, but ideally the distribution of the signatures among a collection of circuits should resemble variates of a random variable. This random variable would correspond to an equally likely or uniform distribution that is independent thus minimizing the probability of a collision among the collection of devices and causing a collection of signatures from different devices to resemble a collection of random values. This leads to one of the main security properties of concern, the property of Collision Avoidance.

Another security property of great interest is that of Repeatability. The requirement for repeatability is often satisfied by taking advantage of variations in integrated circuit (IC) variation. As is well known to IC designers, foundries use fabrication methods that necessarily result in tolerance intervals among the structures present in an IC. Variations among multiple die and within the same die can occur in gate oxide thickness, transistor threshold voltages, and other parameters that likewise affect sub-threshold currents, leakage, power, and switching times [BDM:02]. Variations are also present in device geometry due to lithographic processes in the nanometer region. These variations can manifest themselves as differences in intra-die delay values due to mask variations as well as across an entire wafer due to slight differences in process temperature and pressure differences. Manifested differences in delay values among different dies can be as much as 5% resulting in good candidates for use as a PUF function [GC+:02]. Because [GC+:02] indicates that variations of 5% or more are desirable for a PUF, we use this value as our design goal.

A typically-used academic example of a delay-based PUF is to implement a CMOS ring oscillator comprised of an odd number of N different two-transistor inverters in cascade with the output of the $N^{th}$ inverter connected to the input of the first inverter as depicted in FIG. 1. Increasing the value of N increases or "amplifies" the effect of the previously mentioned manufacturing variations yielding measurable oscillation frequency differences among different oscillators implemented on the same or different die. In fact, the use of ring oscillators for speed binning of manufactured ICs is a well-established practice.

Figure 2:
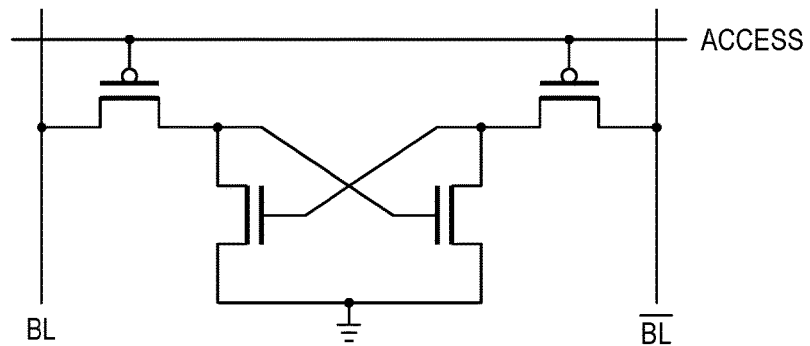
FIG. 2 is a block diagram of a storage structure.

Another exploitation of delay differences that is applicable to the discussion is that of transistor switching speed in an array of single-bit electronic memory cells [KA+:19] or arbiter circuits [MKP:08]. An example basic storage structure present within a four-transistor voltage-mode static random-access memory (SRAM) cell consists of two NMOS transistors in a cross-coupled feedback configuration with two PMOS transistors that serve as access transistors based on the value of the dual-rail bitline signal (BL) as depicted in FIG. 2.

To retain a value (memory read) stored in the cell, the ACCESS line is set to $V_{DD}$ effectively placing the two PMOS transistors into cutoff with the bitlines being charged to $V_{DD}$. A data storage operation (memory write) requires discharging one bitline to ground and setting the ACCESS line to ground, effectively bringing the PMOS transistors out of cutoff and forcing one of the two NMOS transistors to saturate. Depending upon which bitline is toggled from $V_{DD}$ to ground, either a logic-0 or a logic-1 is stored [Nod:97]. A similar four-transistor memory cell can be created by interchanging the NMOS and PMOS transistors, changing the ground settings to $V_{DD}$ and vice versa, and discharging the bitlines to ground during a data retention (read operation) [YC:07]. In this latter case, a write operation occurs when one of the two bitlines is charged to $V_{DD}$.

As is well-known to VLSI designers and computer architects, the switching speeds of the two transistors will always have a slight difference from one another. Thus, when the cell is first powered up, the feedback connections cause a race condition that quickly resolves such that one of the two transistors enters a saturated steady state forcing the other transistor to be cutoff. Depending upon which of the two transistors saturates, the memory cell will either initialize with a logic-one or, alternatively, a logic-zero being stored. A basic PUF structure can be realized as an array of n such basic memory units resulting in an n-bit signature when the cells are initially powered up.

Since the manufactured transistor switching speeds are fixed, this type of PUF is repeatable. Furthermore, as the array size n is increased, the probability of collision among N different PUF structures decreases. Likewise, for a fixed value of n, the probability of collision increases as N increases. These observations provide mathematical guidelines regarding the choice of the number of memory cells per PUF, n, and the total number of anticipated manufactured devices N. There continues to be research motivated to finding new PUF structures to enhance repeatability and decrease the collision probability. New fabrication processes with (typically) decreasing feature sizes provides the motivation to continually search for alternative PUF structures with enhanced security properties.

The fabrication of silicon photonic Integrated Circuits (ICs) is relatively newer as compared to silicon electronic devices. However, there has been more recent work in considering PUF structures for optical/photonic silicon devices [RH+:13a][RH+:13b][RH:14] (it will be noted that herein that the term "optical" may sometime be used when referring to PUF structures operating in the classical mode and "photonic" may sometimes be used when referring to structures operating in the single photon or quantum realm as will be understood from context). According to [AFS:20], "[o]ptical PUFs . . . have largely remained in obscurity, however promising they may be, something which could be attributed to their challenging integration with electronic devices".

It is well-known that fabrication tolerances for silicon optical/photonics ICs are likewise present, especially since most optical/photonic processes make use of well-defined CMOS electronics fabrication processes. As an example, the work in [KVL:11] evaluated manufacturing tolerances resulting from a cascaded micro-ring resonator circuit fabricated in a 130 nm CMOS foundry using 193 nm lithography where statistics were gathered from 500 different four-channel micro-ring arrays over different wafers and manufacturing lots. It was found that waveguide width varied as much as ±3.5 nm. However, one challenging aspect in developing optical/photonic PUFs is the relative increase in sensitivity to operating temperature variations as compared to CMOS electronics, particularly quantum photonics devices.

One of the first published examples of an optical PUF implementation is described as depositing a randomly spaced collection of tiny scatterers [Pap:01][Pap:02]. In this way, an optical IC can be interrogated by a laser beam and the resulting speckle pattern measured with detectors yielding a signature. A challenge/response system can be implemented wherein the angle of the incident laser beam represents the challenge value since the speckle pattern response is dependent upon the incidence-angle. Most recent work in the area of optical PUFs can be considered to be variations or improvements on the use of scatterers and resulting speckle patterns [Sko:08a][Sko:08b] [RH+:13a][RH+:13b] [RH:14]. Virtually all of these approaches are based upon randomized placement of structures (scatterers) due to manufactured device variation. Notably [Sko:08b] is based upon randomized placement of resonators rather than generic scattering structures.

Investigations into photonic PUFs operating within the quantum realm are very recent and much work remains to be accomplished. In [AFS:20] a "quantum readout PUF" (QR-PUF) is proposed that is interrogated with a challenge in the form of a single photon quantum state and with a response also in the form of a quantum state. Quantum PUFs (QPUFs) of this form have an inherently attractive security characteristic. In the presence of a Man-in-the-Middle (MITM) eavesdropping attack, the QPUF remains secure because the eavesdropper would necessarily be required to measure or observe the challenge as well as the response. However, the observation or measurement of a quantum state destroys the state thus making it unobtainable with a single observation as well as causing the QPUF to fail and not provide a valid response (it is assumed that the QPUF challenge/response states are always in quantum superposition).

While so-called "man-in-the-middle" (MITM) eavesdropping attacks are notoriously hard to protect against, the approach of [AFS:20] requires a sophisticated quantum state preparation circuit for the issuance of a challenge. Furthermore, due to the quantum mechanical postulate known as Born's rule, the observation of the response would cause it to collapse into one of the measurement basis states. This implies that a somewhat lengthy sequence of repeated set of transactions would be required since the probability amplitudes of the QPUF responses would need to be estimated by repeatedly measuring the same response and accumulating the resulting measurement basis vectors into a histogram so that the probability amplitudes of the response quantum state could be estimated with some degree of accuracy.

According to embodiment of the PUF (e.g., a QPUF) described herein is specified as a quantum hybrid approach. One interpretation of the "hybrid" design goal is that the PUF be enabled to operate both classically as well as in the quantum realm. Thus, embodiments of a PUF resulting from this effort may have the form of a single structure that has dual-use and can operate both classically or in the quantum realm, it may be two separate structures present on the same device wherein one of the two structures operates classically and the other in the quantum realm, or, it can be a structure that has some subset of shared circuitry that supports both modes of operation. Embodiments may utilize the hybrid approach for a few different reasons. First, it is desired to avoid the necessity of requiring the interrogator to possess a quantum state preparation circuit to prepare a quantum state as a challenge. Second, it is desired to have the capability of avoiding the issuance of a plurality of quantum state challenges followed by performing a number of quantum measurements to estimate the resulting quantum state of the response. Both of these would require complex processing by the interrogating circuit and the system would also be susceptible to decoherence. As a third consideration, the ability of the device to operate both classically as well as in the quantum realm offers more flexibility to the device interrogator, among other advantages.

Different QPUF structures may be utilized in different embodiments. Embodiments described may focus on the use of optical/photonic technology since resulting PUF structures are capable of operation at room temperature. This choice may rule out any type of PUF that relies upon quantum entanglement since boson interaction circuitry is still a research topic (e.g., photon entanglement circuitry implemented on an IC is largely confined to on-chip structures that exploit spontaneous four-wave mixing (SFWM) or, spontaneous parametric down-conversion (SPDC) with off-chip crystalline structures) however, the benefit of room temperature operation would seem to outweigh this disadvantage.

One of the structures that may be utilized in embodiments is based upon the typically-observed variations in the construction of standard photonic cells. While techniques based upon timing, such as phase differences or propagation delays, may be utilized (especially since this characteristic has been successfully used in many conventional electronic PUFs) the very short wavelengths, very high propagation speeds, and relatively small distances available on an optical/photonic IC may provide certain disadvantages. In part, for these reasons among others, embodiments may utilize the geometric variations observed in fabricated instantiations of photonic splitters and couplers present in all standard silicon photonic cell libraries. In the classical mode of operation, these variations manifest as observed amplitude changes of output signals that can be considered as random variables during pre-manufacture and as deterministic and repeatable values for a given device in post-manufacture. In the quantum mode of operation, Born's rule comes into play and instead of post-manufacture repeatably observed amplitude values, embodiments of PUFs as disclosed exhibit predictable variations in the quantum state probability amplitudes that much be estimated through repeated measurements.

Figure 3:
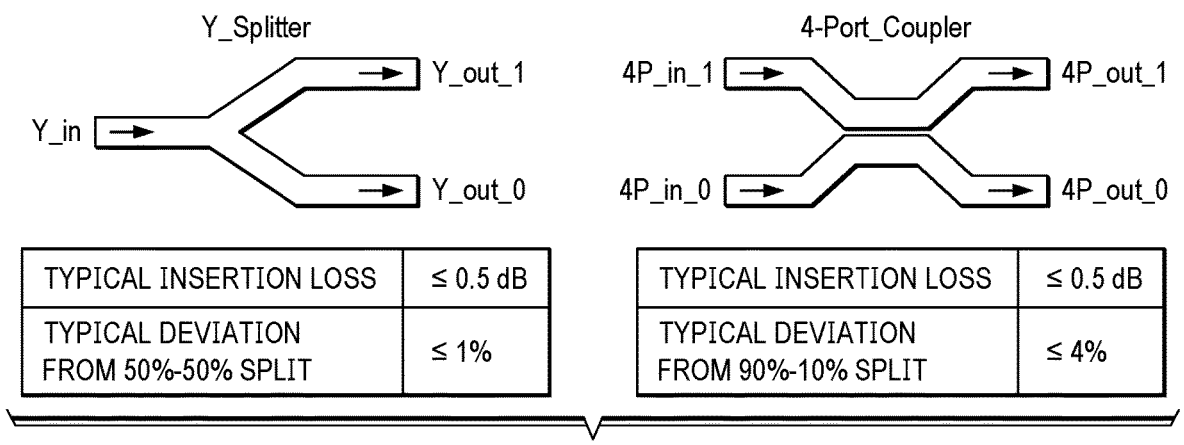
FIG. 3 is a block diagram of optical components.

Certain embodiments of a PUF as disclosed may therefore use just two standard photonic structures; a Y-splitter (or 1-2 Y-coupler) and a 90:10 ratio four-port coupler. These two types of components (cells) are depicted in FIG. 3. FIG. 3 also includes some typical example operational variations that are observed due to geometric imperfections in a standard silicon photonic implementations of these types of cells. It will be noted that these variations are given by way of example and not limitation and that, as will be understood by those of ordinary skill, operational variations of these types of components, among others, will vary based upon design, manufacturing techniques or other consideration.

Embodiments may thus comprise a photonic circuit that serves as an amplitude splitter while substantially increasing (e.g., maximizing) the fabrication deviations. In classical mode, the circuit acts as a nominal (e.g., 3 dB) splitter. However, due to device fabrication variations, a perfect (e.g., 3 dB) split is not achieved. Likewise, in quantum mode, measurements made on each output branch have a nominal 0.5 probability value of photon detection but due to device variations, the 0.5 detection probabilities are modified. The Y-splitter example that was given is specified as having a deviation from a 50/50 that is less than or equal to, for example, 1%. While fairly typical, this deviation may be too low in certain cases given a desired design target of reaching at least 5%. In order to form an overall splitter with a larger deviation, it may be desirable to add additional photonic components (cells) into the signal path.

Due to the details of its construction, a standard 90:10 4-port coupler typically exhibits a relatively larger deviation than the standard Y-splitter when fabricated. Thus, one particular embodiment of a component chain referred to as a "composite splitter" may be formed by chaining a single Y-splitter followed by one or more 4-port coupler cells connected in series to form a combined optical signal path. Using this composite architecture for a component chain, the goal of increasing the overall deviation to exceed the 5% design target may be achieved while maintaining a nominal 50:50 split at the end of the overall signal path.

To aid in understand of embodiments, mathematical models for the different photonic components utilized in embodiments are presented. Specifically, to determine an appropriate structure satisfying the discussed constraints, mathematical models are formulated for each cell based on typically-encountered fabricated chip variations (again such variations are utilized by way of example and not limitation). Equations (1) and (2) give the devised classical model formulated for the Y-splitter. $A_{Yo1}$ and $A_{Yo0}$ denote the amplitude at the ports labeled Y_out_1 and Y_out_0 and $A_{Yi}$ denotes the amplitude at the port labeled Y_in in the left portion of FIG. 3 (the "Y_Splitter"). A splitting variable, $S_Y$, is defined that takes on a real value in the interval [0.0,1.0].

$$A_{Yo1}=(A_{Yi})S_Y \qquad (1)$$

$$A_{Yo0}=(A_{Yi})(1-S_Y) \qquad (2)$$

The devised mathematical model for the 90:10 coupler is given in Equations (3) and (4). These equations are classical models where $A_{4i0}, A_{4i1}, A_{4o0}$ and $A_{4o1}$ are amplitudes at each of the four ports. A splitting variable, $S_C$, is defined that takes on an average value 0.90.

$$A_{4o1}=(A_{4i1})(S_C)+(A_{4i0})(1-S_C) \qquad (3)$$

$$A_{4o0}=(A_{4i0})(S_C)+(A_{4i1})(1-S_C) \qquad (4)$$

Figure 4:
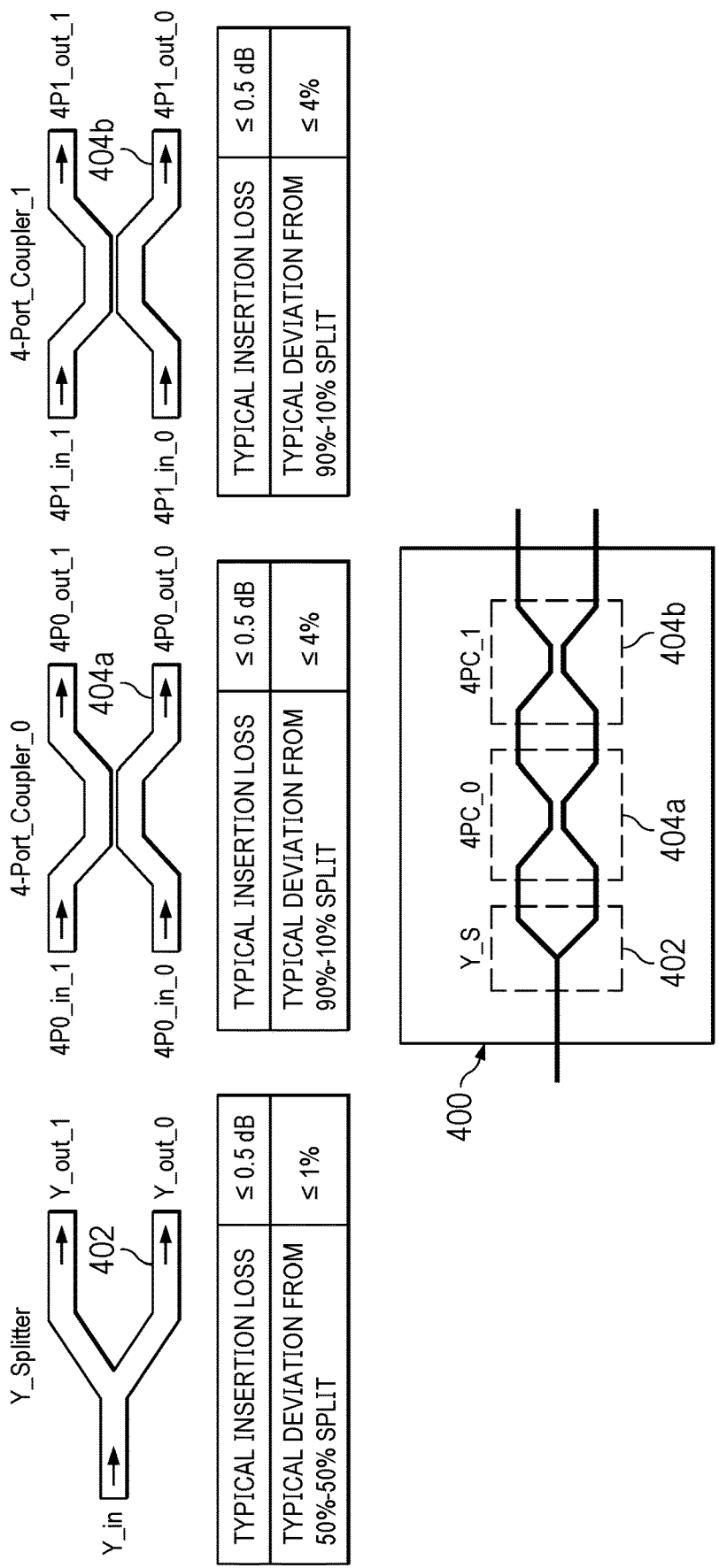
FIG. 4 is a block diagram of one embodiment of a component chain.

In order to construct a component chain that includes a composite 50:50 splitter that has a larger deviation than that of the individual cells, in certain embodiments, two 90:10 couplers may be used in cascade downstream of a Y splitter, as shown in the embodiment depicted FIG. 4. As can be seen in the embodiment of FIG. 4, a component chain 400 (this embodiment of which is referred to as a composite splitter) may include a Y splitter 402 the outputs of which are coupled to a first 4-port coupler 404a, the outputs of which are coupled to a second 4-port couplet 404b. Thus, the input of Y splitter 402 may be the input to the component chain 400 while the output of second 4-port coupler 404b may be the output of the component chain 400.

The goal of realizing a composite 50:50 splitter may be desired because in certain embodiments of a PUF system the optical signals will be detected and converted into proportional voltages. To maximize the signal to noise ratio (SNR) of the detected voltages, it may be desired that the magnitude of each voltage derived from the composite splitter outputs should be large, implying that they should each be approximately equal in magnitude with one possible voltage being negative-valued and the other being positive-valued. Thus, the reference point can be set to zero volts (i.e., ground) and the voltage need only be detected as being positive or negative to determine if the corresponding PUF bit is a logic-0 or logic-1.

The embodiment of the composite splitter depicted in FIG. 4 may function as a (e.g., 3 dB) splitter in classical mode. This may be illustrated with respect to the diagram of that embodiment depicted in FIG. 5. Ideally, each component of the component chain has zero deviation with respect to the specified splitting and coupling factors. The ideal case for the depicted component chain thus corresponds to $S_Y=0.50$ and $S_C=0.90$. Assume that the input signal to the composite structure (component chain) 400 is a constant-amplitude CW laser beam with amplitude $A_{in}$ and the output signals at the topmost port on the right-side of the composite structure 400 is $A_{top}$ and the lowermost port on the right-side is $A_{bot}$. Intermediate signals are $A_1, A_2, A_3$ and $A_4$ as shown in the labeled composite structure.

Figure 5:
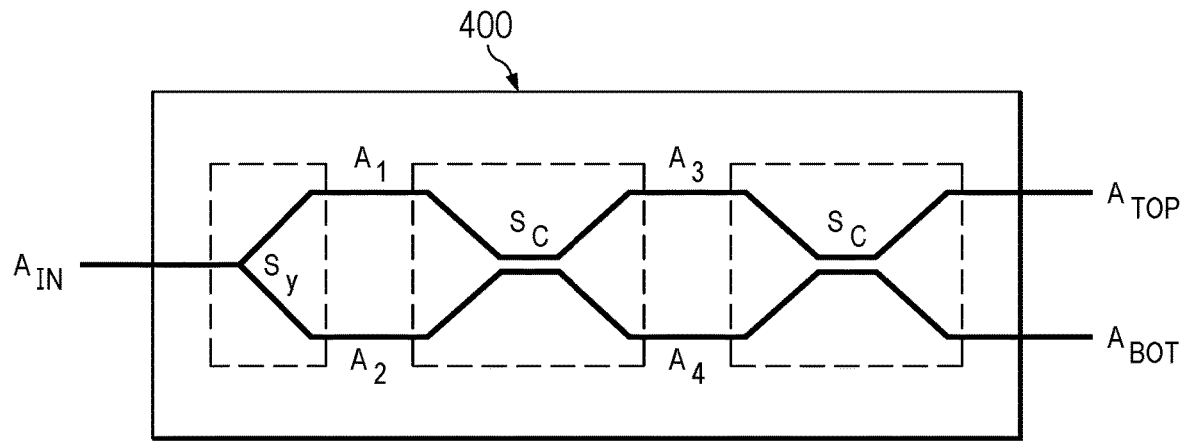
FIG. 5 is a block diagram of one embodiment of a component chain.

Applying the mathematical models in Equations (1), (2), (3), and (4) above to the composite structure 400 in FIG. 5, the following relationships result.

$$A_1=(A_{in})S_Y \qquad (5)$$

$$A_2=(A_{in})(1-S_Y) \qquad (6)$$

$$A_3=(A_1)(S_C)+(A_2)(1-S_C) \qquad (7)$$

$$A_4=(A_2)(S_C)+(A_1)(1-S_C) \qquad (8)$$

$$A_{top}=(A_3)(S_C)+(A_4)(1-S_C) \qquad (9)$$

$$A_{bot}=(A_4)(S_C)+(A_3)(1-S_C) \qquad (10)$$

Substituting Equations (5) and (6) into Equations (7) and (8) results in Equations (11) and (12).

$$A_3=[(A_{in})S_Y](S_C)+[(A_{in})(1-S_Y)](1-S_C) \qquad (11)$$

$$A_4=[(A_{in})(1-S_Y)](S_C)+[(A_{in})S_Y](1-S_C) \qquad (12)$$

Simplifying Equation (11) results in Equation (13).

$$A_3=A_{in}[(S_Y S_C)+(1-S_Y)(1-S_C)]$$

$$A_3=A_{in}[S_Y S_C+1-S_C-S_Y+S_Y S_C]$$

$$A_3=A_{in}[2S_Y S_C-S_C-S_Y+1] \qquad (13)$$

Simplifying Equation (12) results in Equation (14).

$$A_4=[(A_{in})(1-S_Y)](S_C)+[(A_{in})S_Y](1-S_C)$$

$$A_4=A_{in}[S_C-S_Y S_C+S_Y-S_Y S_C]$$

$$A_4=A_{in}[S_C+S_Y-2S_Y S_C] \qquad (14)$$

Substituting Equations (13) and (14) into Equations (9) and (10) results in Equations (15) and (16).

$$A_{top}=A_{in}[2S_Y S_C-S_C-S_Y+1](S_C)+A_{in}[S_C+S_Y-2S_Y S_C](1-S_C) \qquad (15)$$

$$A_{bot}=A_{in}[S_C+S_Y-2S_Y S_C](S_C)+A_{in}[2S_Y S_C-S_C-S_Y+1](1-S_C) \qquad (16)$$

Simplifying Equation (15) results in Equation (17).

$$A_{top}=A_{in}[2S_Y S_C-S_C-S_Y+1](S_C)+A_{in}[S_C+S_Y-2S_Y S_C](1-S_C)$$

$$A_{top}=A_{in}[2S_Y S_C^2-S_C^2-S_Y S_C+S_C S_C-S_C^2+S_Y-S_Y S_C-2S_Y S_C+2S_Y S_C^2]$$

$$A_{top}=A_{in}[4S_Y S_C^2-4S_Y S_C-2S_C^2+2S_C+S_Y] \qquad (17)$$

Simplifying Equation (16) results in Equation (18).

$$A_{bot}=A_{in}[S_C+S_Y-2S_Y S_C](S_C)+A_{in}[2S_Y S_C-S_C-S_{Y+}1](1-S_C)$$

$$A_{bot}=A_{in}[S_C^2+S_Y S_C-2S_Y S_C^2+2S_Y S_C-S_C-S_Y+1-2S_Y S_C^2+S_C^2+S_Y S_C-S_C]$$

$$A_{bot}=A_{in}[4S_Y S_C-4S_Y S_C^2+2S_C^2-2S_C-S_Y+1] \qquad (18)$$

Substituting the ideal splitting values, $S_Y=0.50$ and $S_C=0.90$ into Equations (17) and (18) results in Equations (19) and (20).

$$A_{top}=(0.50)A_{in} \qquad (19)$$

$$A_{bot}=(0.50)A_{in} \qquad (20)$$

Thus, the embodiment of the component chain in FIG. 5, herein referred to as the "composite splitter," is equivalent to a (e.g., 3 dB) splitter in the ideal case.

Due to the desire to avoid challenging the PUF with generalized quantum states, while also enabling quantum photonic operation, an embodiment of a PUF may use quantum states initialized to the basis state, |0⟩. This desire may be achieved in one embodiment by implementing the challenge/response portion of the PUF system classically in electronics. The fabrication variations that may be exploited are naturally-occurring deviations that are generally observed, for example, Y-splitter and 4-port coupler photonic components as discussed, whereas the challenge/response circuitry may be implemented after photonic detection in the electronic portion of the PUF system.

Figure 6:
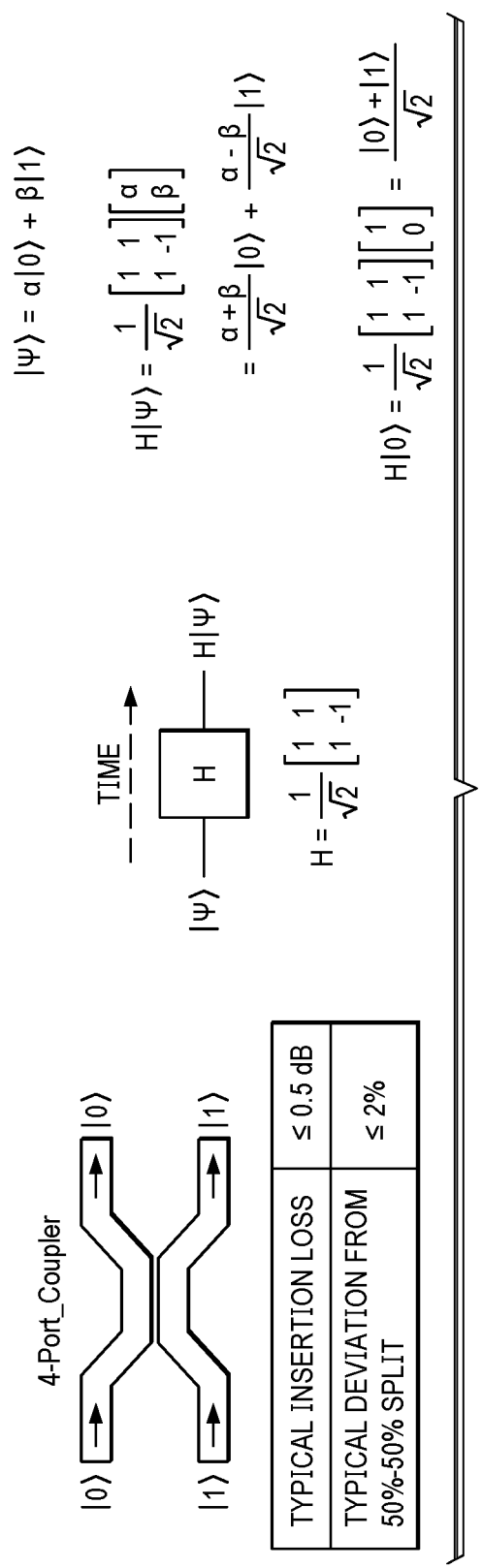
FIG. 6 is a block diagram of a 4-port coupler.

Single photons can serve as state-carrying hosts in the quantum realm. Any observable quantum mechanical characteristic can, in theory, be used to represent quantum information. For example, the position or location observable can be implemented in silicon-based quantum photonic ICs using dual-rail encoding. Dual-rail encoding refers to the use of two waveguides that are each labeled with one of the computational basis states, |0⟩ and |1⟩. Quantum operators can be implemented, such the Hadamard gate, H, with these same cells. FIG. 6 depicts an example version of a 4-port coupler (e.g., as discussed above), a standard schematic representation of the Hadamard function and the corresponding standard quantum computing operator for the Hadamard gate (the 90-degree relative phase shift that occurs between output ports 4P_out_1 and 4P_out_0 is not mentioned with the understanding that if a 3 dB four-port coupler were to be used as a true Hadamard gate, a −90 degree phase shift would need to be included among the output ports).

Figure 7:
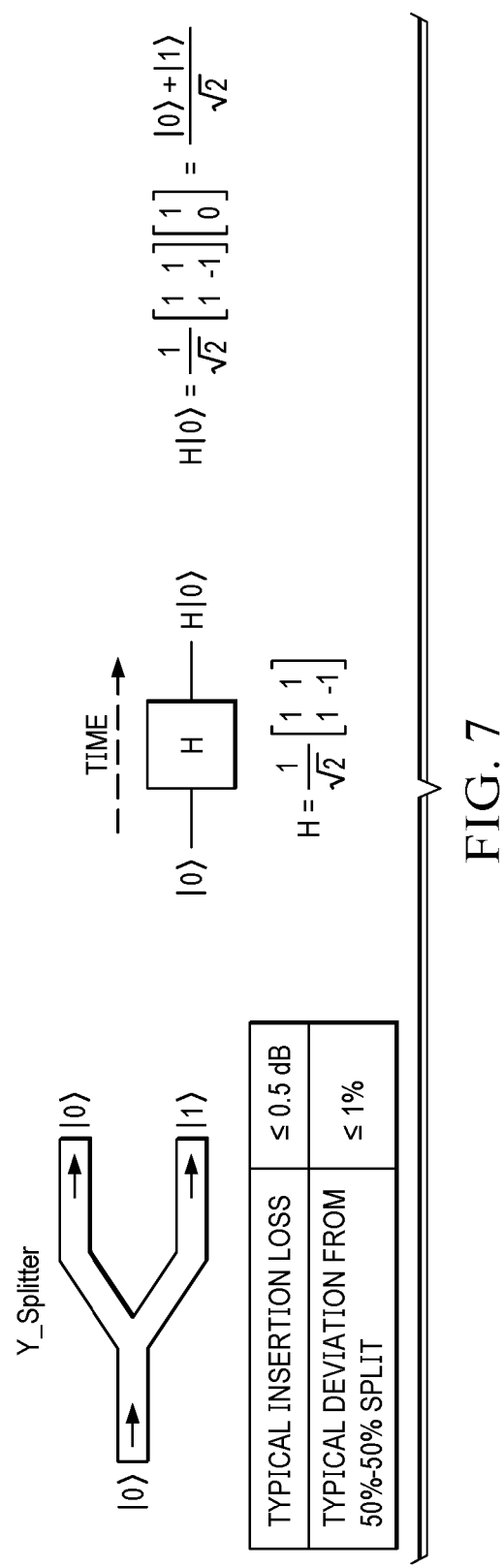
FIG. 7 is a block diagram of a splitter.

As depicted with respect to FIG. 6, if the incident dual-rail photonic quantum bit is restricted to only having computational basis state values, |0⟩ or |1⟩, then a three-port (or 3 dB Y-splitter) may be utilized in embodiments. Observing that the input quantum state could be restricted to a single basis state would only require a single input port and the fact that the probability amplitudes are equal-valued and equal to the reciprocal of the square-root of two is sufficient to indicate that the standard 4-port coupler could serves as a quantum Hadamard operator (i.e., it could be replaced by a (e.g., 3 dB) Y-splitter) for this special case. FIG. 7 illustrates an example of this special use-case. Note that, for many photonic circuit implementations, a 50-50 Four-Port coupler may exhibit a lower output signal strength variability (on the order of 2%) than that of a typical 90-10 Four-Port coupler (~4%).

From the point of view of the identified specifications for an embodiment of a PUF then (e.g., as discussed above), the component chain (e.g., composite splitter) design can also be operated in the quantum mode where the Y-splitter is considered a Hadamard operator for a dual-rail qubit for the case where the input quantum state to the PUF is restricted to the |0⟩ computational basis state. Furthermore, as shown above with respect to the composite structure serving as a splitter, the overall composite structure is likewise ideally a Hadamard operator (e.g., neglecting phase shifts) since the structure yields a 3 dB spitter in the ideal case. While this restriction may seem to be limiting, it actually avoids the difficulties in using the QPUF described in [AFS:20] since quantum operation can be achieved without concerns due to supplying challenges to the QPUF in the form of generalized quantum states that are susceptible to decoherence.

Figure 8A:
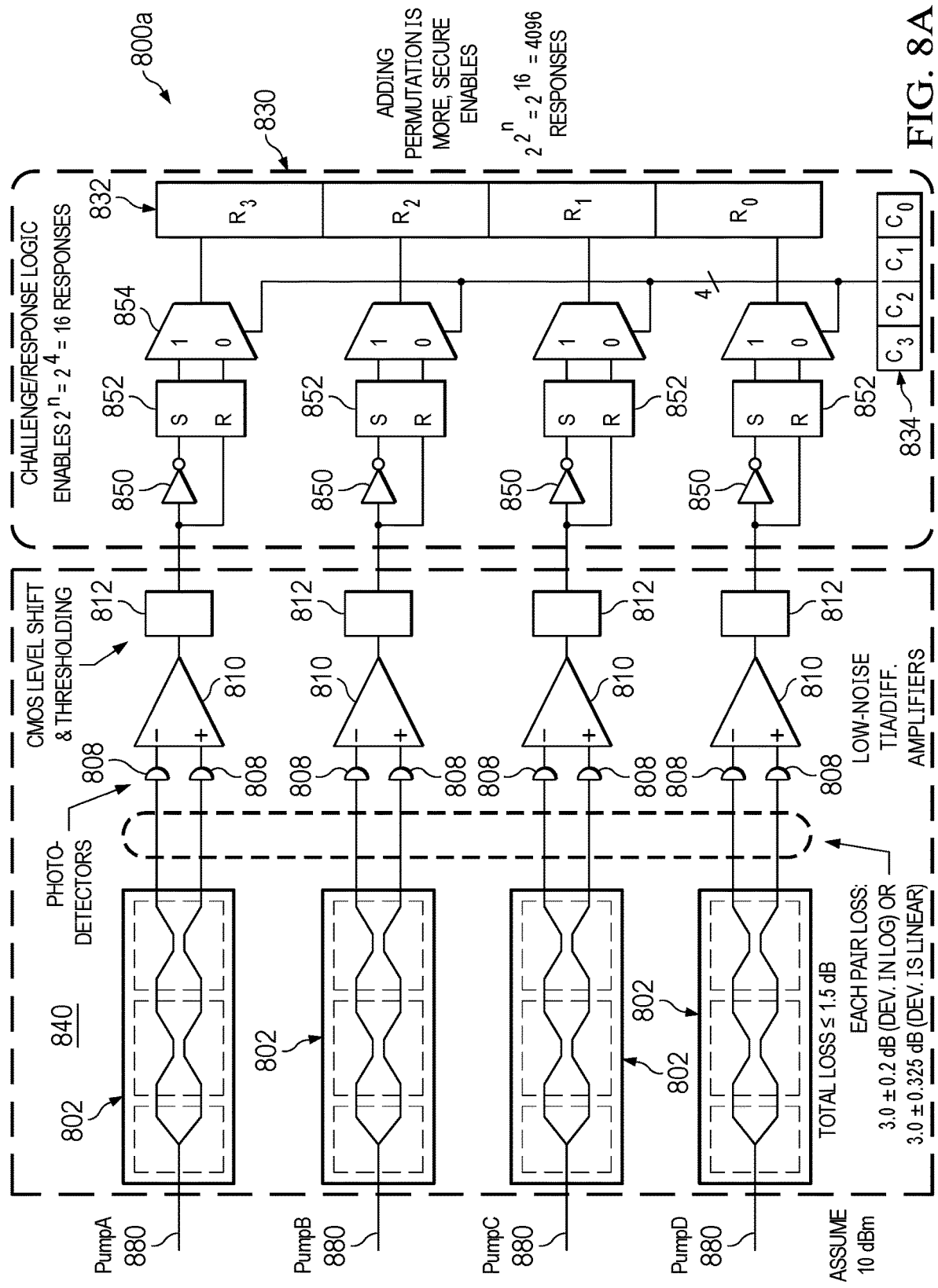
FIGS. 8A and 8B are block diagrams of an embodiment of a hybrid PUF system.
Figure 8B:
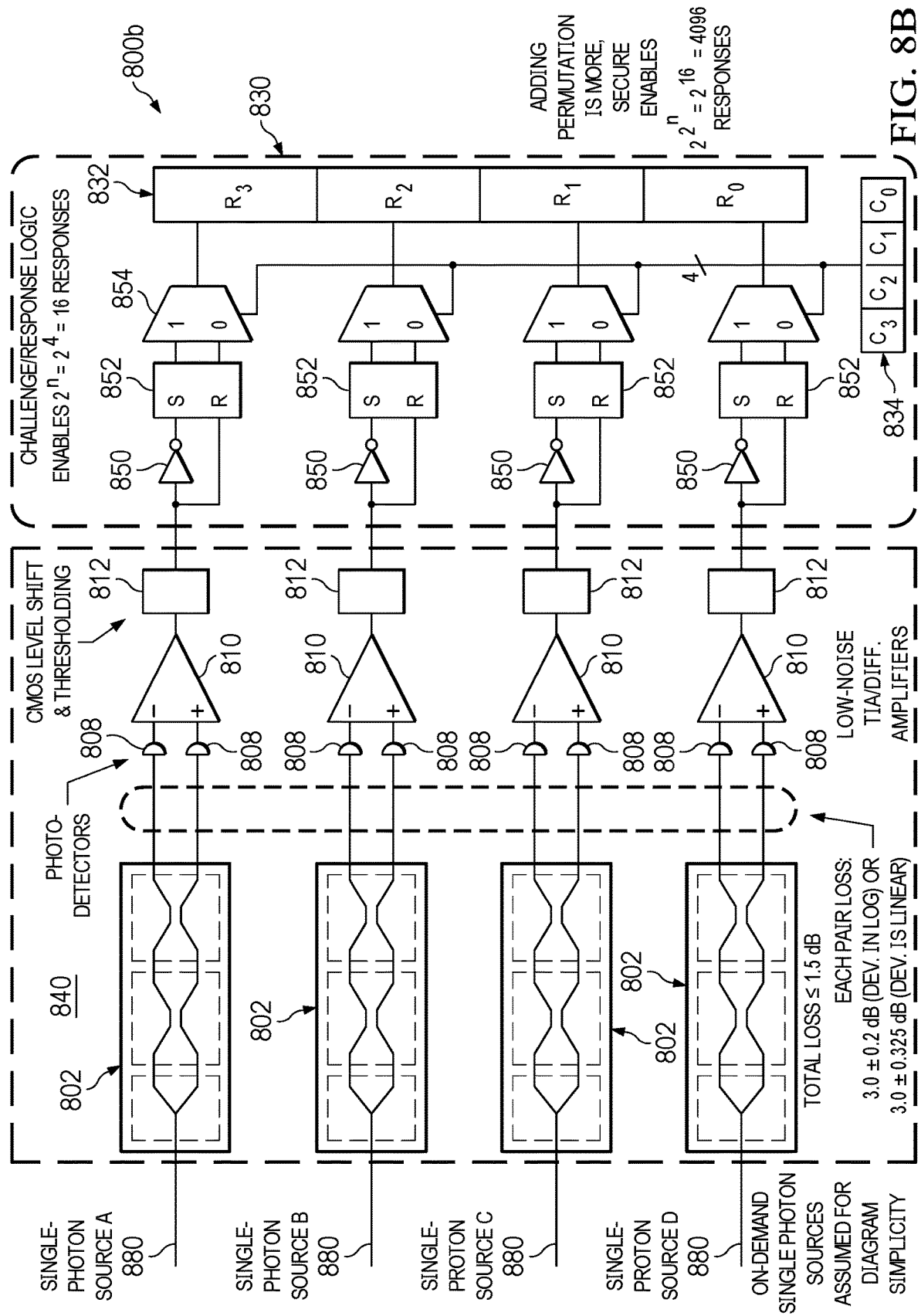

It may now be useful to consider embodiments of a PUF system utilizing embodiments of a PUF employing a component chain such as a composite splitter that can operate in a classical domain or a quantum domain. In particular, FIG. 8A depicts a four-bit hybrid PUF system based on the fabrication variations in a composite splitter adapted for use when operating in classical mode while FIG. 8B depicts the same four bit hybrid PUF based on the fabrication variations in the composite splitter adapted for use when operating in quantum mode.

Thus, an embodiment of PUF system 800 (e.g. 800a and 800b) may include a PUF (e.g., PUF logic or circuitry) 840 adapted to generate a signature of a particular bit width (e.g., in the depicted example 4) where each bit of the bit width of the PUF can be generated utilizing a respective component chain 802 including at least one optical component. As discussed, the chain (e.g., one or more) of components 802 (e.g., hardware or physical implementation of a function which include, for example photonic or electrical circuits) utilized to generate the bits of the signature for the PUF may thus be identical in design and intended function. However, each of these component chains (e.g., and each individual component of the chain) may have variations. These variations may be introduced intentionally or unintentionally (or both); intentionally through a design of the component (e.g., a design that introduces variation to the component while keeping the intended functionality the same) or unintentionally by, for example, variation introduced through the manufacturing process or related tolerances of the component.

Specifically, according to one embodiment, a chain of photonic or optic components may be utilized as a component chain 802 in such a PUF 840, where the photonic components may be coupled to one another to provide a photonic path. As but one example, as discussed above, component chain 802 may include a first component of the component chain comprising a Y splitter, where each output of the Y splitter is coupled to a respective input of a (first) 4-port coupler and each output of that (first) 4-port coupler is, in turn, coupled to a respective input of another (second) 4-port coupler.

The output of the component chain 802 is coupled to a photodetector 808. In one embodiment, therefore, each output of the second 4-port coupler in the component chain 802 is coupled to a respective photodetector 808. The output of each of these photodetectors 808 is coupled to a respective input of a differential amplifier 810. The differential amplifier 810 is adapted to take a difference of the two input signals such that the output of the differential amplifier corresponds to the value of a bit of the signature of the PUF 840.

Turning first to FIG. 8A, when utilized in a classical domain, there may be a photon source 880 comprising a photon pump coupled to the input of each component chain 802 corresponding to each bit of the PUF signature (e.g., in the depicted example, four component chains 802 for a 4-bit PUF signature width). Thus, when a photon is generated by the photon source 880, the photon (or portion of the energy thereof) will travel through the associated component chain 802 coupled to the photon source 880. The path the photon takes through the component chain 802 is determined not only by the design of the component chain 802, but additionally by the variation of each component of the component chain 802. The presence, absence (or amount) of photonic energy on each output of the second 4-port coupler of the component chain 802 can then be detected (or not detected) by the respective photodetector 808 coupled to each output of the final component of the second 4-port coupler of the component chain.

The output of each of these photodetectors 808 is coupled to a respective input of differential amplifier 810. The differential amplifier 810 takes a difference of the two input signals (e.g., from each photodetector 808) such that the output of the differential amplifier 810 corresponds to the value of that bit of the signature of the PUF. It will be noted that in some embodiments the output of the differential amplifier 810 may be coupled to additional circuitry or components 812 to facilitate the use of that output signal in other circuitry (e.g., level shifting circuitry or challenge and response circuitry). For example, additional circuitry may include, for example, level shifting or thresholding circuitry 812 that may increase (or decrease) a logical level or voltage domain of the output of the differential amplifier such that the signal can be utilized by downstream circuitry or component.

Referring to FIG. 8B, the operation in the quantum mode for PUF system 800*b* may be substantially similar to that as described in FIG. 8A. Here, however, when utilized in a quantum domain, there may be a photon source 880 comprising a single photon source coupled to the input of each component chain 802 corresponding to each bit of the PUF signature (e.g., in the depicted example, four component chains 802 for a 4-bit PUF signature width). It will be noted here that a series of single qubit measurements may be required when operating embodiments in the quantum domain and these repeated measurements utilized to determine unequal measurement probabilities that can be converted to a logical 0 or 1 in the signature generated by the PUF or in the response generated by associated challenge and response circuitry.

Particular embodiments of a PUF system 800 may also include challenge and response logic (circuitry) 830 that allows a response 832 (e.g. a set of bits) to a challenge 834 (e.g., a set of bits) to be generated based on the signature generated by the PUF 840. The challenge and response may, for example, be the same bit width as the signature generated by the PUF 840 (e.g., in the depicted embodiment 4 bits). This challenge and response logic 830 may take as input each bit of the signature generated by the PUF 840 (e.g., the output of the differential amplifier 810 or level adjustment or thresholding logic 812 coupled to the output of the differential amplifier 810). The output of the differential amplifier 810 (or thresholding logic 812) is coupled to an inverter 850 and one input of an SR latch 852. Each output of the SR latch 852 is coupled to a respective 2-1 multiplexer 854. The select signal of multiplexer 854 may be coupled to a register or other type of memory which may have the challenge 834 loaded therein. The multiplexer 854 can thus be selected by the value of a respective bit (e.g., or the entirety of) the challenge value (e.g., as contained in the register). The output of the multiplexer 854 thus comprises the value of a bit the response 832 and can be stored in a register for returning in response to the received challenge 834. In some cases, therefore, embodiments of the challenge response logic 830 will be adapted to provide $2^n$ responses to a challenge value of n bits. Moreover, permutation circuitry (as is known in the art, not shown) may be added to embodiments of the challenge and response logic 830 or PUF system 800 as disclosed to enable a greater range of responses (e.g., by adding permutation circuitry $2^{2^n}$ response to a challenge value of n bits may be achieved.

To elaborate on embodiments in more detail, as can be seen photodetectors 808 are used at each output branch of the composite Y-splitter of component chain 802. Standard silicon photonics cell libraries contain different detector options that could potentially be used for this purpose, and for single-photon (quantum) operations. In certain embodiments it may be desired to choose the detector with the lowest possible dark current. Since the dark current is a random signal from a statistical point of view, the variability it provides is not repeatable. In this example, a detector with a dark current specification on the order of ~25 nA was chosen. Other types of photodetectors are possible and fully contemplated herein.

In the quantum mode of operation, the composite splitter 802 is excited by incident heralded photons and the outputs of the detectors 810 are used as observables. The projective measurement provided by such detectors is probabilistic in accordance with Born's rule. For the ideal case, when the composite splitter 802 is 50:50 with no deviation, using input photonic qubits in the $|0\rangle$ basis state results in a quantum state of the form as computed in Equation (21).

$$H|0\rangle = \frac{1}{\sqrt{2}}\begin{bmatrix} 1 & 1 \\ 1 & -1 \end{bmatrix}\begin{bmatrix} 1 \\ 0 \end{bmatrix} = \frac{1}{\sqrt{2}}\begin{bmatrix} 1 \\ 1 \end{bmatrix} = \frac{1}{\sqrt{2}}|0\rangle + \frac{1}{\sqrt{2}}|1\rangle \quad (21)$$

Given the theoretically perfectly superimposed state generated by the composite splitter 802, the probabilities of measuring either basis state, $|0\rangle$ or $|1\rangle$, with ideal detectors 808 is given in Equations (22) and (23).

$$P[|\Psi\rangle \rightarrow |0\rangle] = \left(\frac{1}{\sqrt{2}}\right)^2 = \frac{1}{2} \quad (22)$$

$$P[|\Psi\rangle \rightarrow |1\rangle] = \left(\frac{1}{\sqrt{2}}\right)^2 = \frac{1}{2} \quad (23)$$

In embodiments, therefore, a series of such single qubit measurements will be required. The number of times that the $|0\rangle$ detector or the $|1\rangle$ detector 808 indicate the presence of energy are accumulated and the accumulated detection counts are then used to estimate the square of the magnitude of the quantum state probability amplitudes. Due to the fact that the composite splitter 802 exhibits an enhanced and repeatable deviation from a perfect 50:50 splitter causes the repeated measurements to yield repeatable approximations of unequal measurement probabilities that can then be converted to either a conventional logic-0 or logic-1 bit (e.g., in the PUF response word 832). In will be noted that there may be tradeoffs in PUF security as a function of the number observed measurements.

Based upon these observations, the composite splitter-based architecture for a PUF system can either be operated in the classical or the quantum realm. The particular mode of operation is selected, in part, through the choice of exciting the composite splitter with either a CW beam or a sequence of single photons. Finally, the post-detection electronics differs for the classical versus the quantum mode as previously discussed.

As may also be noted concerning operation of the PUF in the quantum realm is that there may be a need for (e.g., circuitry for) generating heralded photons. There are a number of well-known and well-understood mechanisms for quantum photonics implementations including the generation of such photons, the details of which will have no impact on the operation of embodiments of the PUF systems as disclosed.

As discussed, embodiment of PUF systems and disclosed may be operated in the quantum realm or the classical realm. Thus, certain embodiments of the PUF systems as discussed may be adapted to generate a response (e.g., to a challenge) using classical (electrical) signals (e.g., rather than a quantum signal) by utilizing electronic challenge response circuitry 830. One possible motivation for the use of this type of PUF system may be a desire to avoid the need for using a quantum information channel, to avoid concerns due to decoherence when operating in the quantum mode, and to avoid the requirement that the interrogating devices be equipped with quantum state preparation and quantum state measurement circuitry.

To elaborate in more detail with reference to FIG. 8A, because detectors 808 convert input light energy into a proportional current value, differential amplifiers 810 may be used to convert the detected current values into voltages. Such a differential amplifier 810 may, in one embodiment, comprise transimpedance amplifiers (TIA). Each pair of converted voltage values that correspond to an output pair of a single composite splitter 802 are then input into a voltage-mode differential amplifier (e.g., a combination of two transimpedance amplifiers and the single differential amplifier). It is noted that an alternative implementation may be to use a single current-mode differential amplifier followed by a single TIA. Other embodiments using other forms of differential amplifiers are contemplated herein, however, it may be desirable for certain embodiments that the specific form of the amplifier circuitry utilized should be chosen to minimize the induced noise contributed by these active electronic components. Specifically, it may be desirable that the amplifier circuitry be chosen to have the lowest noise figure possible since any noise contributed to the signals at the detector outputs will serve to randomly perturb the signals. In certain embodiments, the primary goal of the amplifier circuitry is to produce a voltage that has either a negative non-zero magnitude, or a positive non-zero magnitude. In some cases, the larger the magnitudes of the voltage, the better since the key purpose of the amplifier output is to reliably and repeatably produce a voltage of the same magnitude for each observation of the response bits. Larger magnitude voltages may indicate the production of a higher overall SNR.

The additional circuity 812 following the amplifier 810 may serve as a CMOS level-shifting and thresholding circuit. This additional circuity 812 may be desirable to provide the proper signal levels to drive the digital logic inverters and SR-latches 852. The uncomplemented (i.e., positive polarity) latch outputs of SR latches 852 yield a response due to variations in the composite splitters 802. In order to provide a challenge/response mechanism, both the complemented and uncomplemented outputs of the SR-latches 852 are used to drive the data inputs of a bank of 2:1 multiplexers 854. In this way, the response generated by the challenge response logic 830 can be selected on a bit-by-bit basis to utilize either complemented or uncomplemented result of the composite splitter 802. This selection is accomplished via the n-bit challenge input 834, $C_{n-1} \ldots C_1 C_0$ that that is connected to the select lines of the multiplexers 854. Because all possible bitstrings can be provided as a challenge 834, the response 832 can also be selected to be any of $2^n$ different response bitstrings, $R_{n-1} \ldots R_1 R_0$. Although not shown in the small four-bit example in FIGS. 8A and 8B additional security could be achieved by expanding the challenge word 834 to contain additional bits that select a particular permutation of the 2:1 multiplexer output bits. The same permutation circuitry could be employed for the PUF system 800 regardless of whether it is operating in classical or quantum mode.

It is emphasized that the electronic portion shown in FIG. 8A corresponds to the PUF system 800a operating in classical mode. When operating in quantum mode, the electronics downstream of photodetectors 810 may include digital electronics that simply counts or accumulates the number of detections up to a maximum of $N_{tot}$ counts per composite splitter 802. The accumulators are then input to magnitude comparators that output a response bit for response 832 based upon which composite splitter 802 output had the highest detection count. Furthermore, in quantum mode, CW laser pumps may be replaced by heralded single photon generators and the accumulators may thus only be incremented if a corresponding idler photon is detected simultaneously with the photon that exits the composite splitter 802 (e.g., within an appropriate time window).

A key element in formulating proofs regarding security or other properties, is the appropriate selection of formal mathematical models that are sufficient to enable reasoning, deduction, and logical analysis to occur. Most approaches involve the formulation of a statistical model. Some formal approaches regarding PUFs and security incorporate other theoretical aspects such the work in [TS+:05] where an information theoretic approach was undertaken. Other approaches include formulation of a protocol in which the PUF is used with corresponding reasoning based on the protocol as in [Sim:91][Sko:09].

It is nearly always the case that random variables used in the underlying statistical models are assumed to have Gaussian distributions. One reason for this assumption is that the variations in IC fabrication are assumed to have a normal distribution and this approach can be somewhat justified with arguments arising from the Central Limit Theorem. Examples are [BDM:02] [GC+:02][MKP:08]. More thorough analyses indicate that other distributions are appropriate depending upon the type of variation [BN:99].

While the Gaussian distribution assumptions certainly do have a good degree of justification, the use of distributions that more closely approximate the particular variations being considered enhances the modeling accuracy of the PUF. IC foundries generally do collect data and thus have access to information regarding the statistical distributions of fabricated device variations. However, this type of information is generally considered to be proprietary and is closely guarded. For this reason, it may be desirable that pre-manufacture analyses of potential PUF structures is based upon variation data that is published along with formulated statistical models.

The statistical models used in pre-manufacture analyses can be changed to more closely reflect reality after post-manufacture testing has occurred since a sample of devices can be characterized and statistical point estimates calculated. However, even with post-manufacture estimators, caution should be employed since only a sample of devices as compared to the entire theoretical population are available. Furthermore, the statistical device variation models are generally different for intra-die sample populations, inter-die populations restricted to a single or very few wafers, and populations comprising a large set of wafers.

From a pre-manufacture analysis standpoint, the best available information is that from the published standard cell catalog made available to designers that intend to use a particular fabrication facility. Another important consideration is that the values regarding the typical device variations used above are present in all silicon photonic standard cell implementations, are composite in nature and are due to both systematic as well as random phenomena. An example of a systematic variation is one where correlations exist between various design aspects such as channel length and channel width. A random variation may be due to variations in the purity of the materials such as fluctuations in optical waveguide fill materials. Some variations are in fact deterministic functions of other variations. For example, the threshold voltage of an NMOS transistor may be due to transistor geometry variations due to photolithographic or etching resolution in combination with the regularity of the doping material deposits.

Even when post-manufacture samples are available, some quantities are not directly observable and must be inferred from other measurements that are possible. This is an example where device models are required even for post-manufacture analysis since such models are required to be used when model parameter extraction is employed such as that described in [SA:93]. Most device models for IC fabrication variations are non-linear [AM:88] such as the Shichman-Hodges model for a MOSFET [SH:68]. Model parameter extraction is the process of applying a device model and a set of measurable variations to a process of extracting or estimating non-measurable variations. Typically, model parameter extraction is accomplished through the use of a non-linear least squares analysis.

It is almost always the case that the statistical distributions of various sources of variation are censored. That is, the temperature may be guaranteed to fall within some predetermined range $[T_1,T_2]$, but within this range, a random distribution occurs. The different independent phenomena that are lumped together to report overall device variations are highly likely to each vary in accordance with a different set of distributions. For example, variations due to temperature may well be best modeled as some form or parametric or non-parametric censored distribution. For example, the temperature controls may be guaranteed to fall within some strictly defined range $[T_1,T_2]$, but the distribution within this range could be best characterized with a probability distribution (pdf) of $f_{TEMP}$ whereas the variation due to pressure differences during manufacture is also censored to be guaranteed to fall within the interval $[P_1,P_2]$, but wherein the pdf within this interval is $f_{PRES}$ where $f_{TEMP} \neq f_{PRES}$. Even when the censored pdf functions are the same, it is almost certainly the case that their characterizing parameters (e.g., mean, variance, etc.) differ in value.

The validity and accuracy of the device model may be of special importance, particularly for the physical one-way functions employed by embodiments of a PUF system as disclosed. While intervals over device variation are available, the censored pdf describing these variations is generally not available. An example is that Y-splitter variation from a 50:50 split is specified as not exceeding 1%; however, if the true distribution of variations within this interval had a very low variance from the mean, then exploitation of the splitter variation would likely not prove to have the desired efficacy for a PUF since most devices would have nearly the same splitter variation that was effectively equal to the mean value. For this reason, the commonly adopted method of assuming a Gaussian distribution may be not employed here and instead a more appropriate distribution is utilized.

Using the example Y splitter depicted in FIG. 3, as given a typical Y-splitter deviation for the 50:50 split is less than or equal to 1%. The mathematical model for the Y-splitter is given in Equations (1) and (2) as $A_{Yo1}=(A_{Yi})S_Y$ and $A_{Yo0}=(A_{Yi})(1-S_Y)$ The splitting factor, $S_Y$, is thus a random variable defined over the real-valued interval [0.0, 1.0]. Instead of defining two random variables, one for each of the 50% output signal ports, the property of conservation energy dictates the fact that the total amount of energy present at the output ports must equal the amount of energy that was originally incident to the device less any internal device losses. Typical internal device losses observed in a standard silicon photonic process are on the order of 0.5 dB, equating to approximately a 10.8% loss of total incident signal energy. Under the assumption that each output port undergoes an equal amount of internal device loss, it is appropriate to define a single random variable, in this case $S_Y$, to represent the splitter deviation. Thus, one output port is represented by the splitting random variable, $S_Y$, and the other port would then utilize a splitting factor of $1-S_Y$. For this reason, it is chosen to define the random variable with respect to one output port. A more accurate model may use two independent random variables, one to represent the internal losses on a per output port basis and another for the splitting deviation. As another alternative, two random variables representing a composite splitting factor and loss factor for each output port may be used. In any case, such a model containing two random variables may be difficult to formulate since standard cell documentation usually does not contain information regarding the distribution of internal device losses on a per output port basis.

A key observation is that splitting factors are fixed, and thus deterministic values after a device has been manufactured. However, before the device is manufactured, it is appropriate to consider the splitting factor to be a random variable since any of a number of different manufacturing, environmental, and random effects can cause the implemented device to exhibit a particular actual splitting factor. For this reason, Equations (1) and (2) can correctly be viewed as a statistical device model for the Y-splitter and likewise Equations (3) and (4) are statistical device models for the four-port 90:10 coupler.

The Y-splitter random variable is distributed according to the β-Distribution. The random variable, $S_Y$, is β-distributed with parameters $\alpha=124.5$ and $\beta=124.5$. Random variables that exist over the real interval [0.0, 1.0] are, by definition, distributed according to the β-distribution. The pdf of a β-distribution is given in Equation (24)

$$f(s_Y;\alpha,\beta) = \frac{1}{B(\alpha,\beta)} = s_Y^{\alpha-1}(1-s_y)^{\beta-1} \qquad (24)$$

where $B(\alpha,\beta)$ is the beta function. The only remaining task is to determine the β-distribution parameters, $\alpha$ and $\beta$. To determine the parameters, we make use of the well-known relationships for the β-distribution in Equations (25) and (26).

$$\mu = \frac{\alpha}{\alpha+\beta} \qquad (25)$$

$$\sigma^2 = \frac{\alpha\beta}{(\alpha+\beta)^2(\alpha+\beta+1)} \qquad (26)$$

It is assumed that the distribution mean is given by the variate of the random variable $S_Y$ for the ideal case of the Y-splitter where a 50:50 split is achieved with zero deviation. This assumption implies that $\mu=0.50$. Substituting a mean value of 0.50 into Equation (25) and simplifying the resultant expression indicates that $\alpha=\beta$. Next, the typical maximum deviation of 1% is used as the standard deviation, a =0.01. This assumption is, at best, an approximation of the standard deviation since the definition of standard deviation is actually based on an L2 deviation of the form given in Equation (27).

$$\sigma = \lim_{N \to \infty} \left| \sqrt{\frac{1}{N-1} \sum_{i=1}^{N} (s_i - \mu)^2} \right| \quad (27)$$

In all likelihood, the specified maximum deviation of 1% as given for a standard Y-splitter is a L1 deviation of the form, $$\frac{1}{N_{tot}} \sum_{i=1}^{N_{tot}} |s_i - \bar{s}|,$$

where $N_{tot}$ is the total number of samples used by the foundry to compute the specified 1% deviation ands is the sample estimate of the mean. However, the equations used to derive the specified splitter deviation are not always provided. Nevertheless, in spite of these concerns, our experience tells us that the $\sigma=0.01$ approximation with Equations (26) and (27) is not out of the ordinary. Using the derived relationship, $\alpha=\beta$, Equation (26) becomes:

$$\sigma^2 = \left(\frac{1}{4}\right)\frac{1}{2\alpha + 1}.$$

Figure 9:
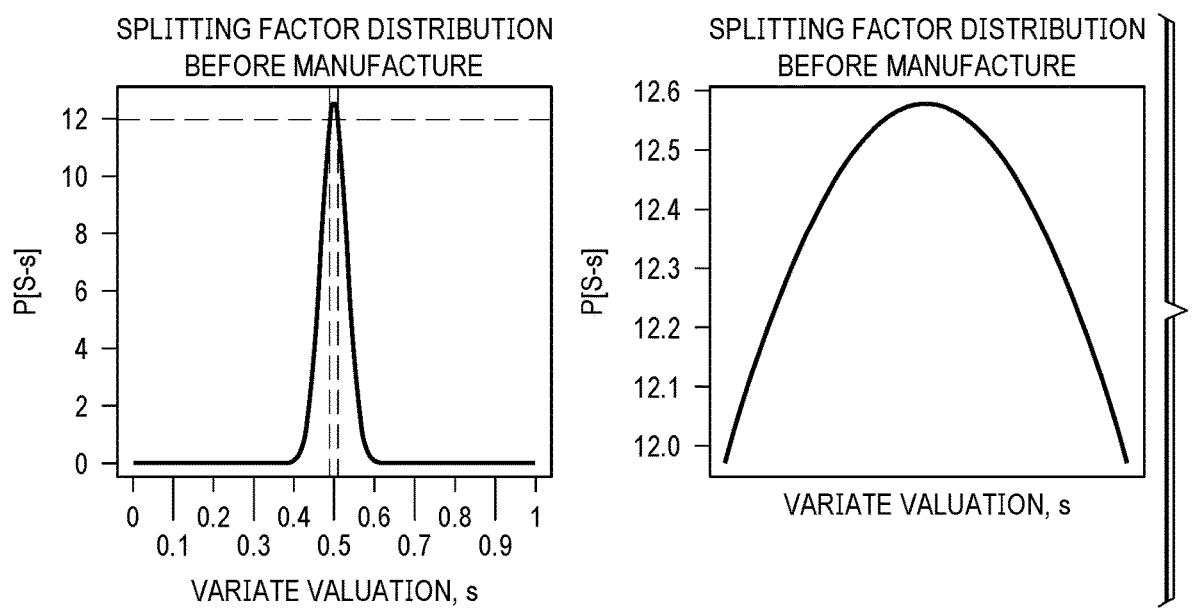
FIG. 9 depicts graphical plots.

Using the above derived expression with $\sigma=0.01$ yields the result that $\alpha=\beta=124.5$. Therefore, the Y-splitter random variable $S_Y$ is beta-distributed with parameters $\alpha=\beta=124.5$. To gain additional insight into the distribution of the Y-splitter splitting variable, the statistical modeling language R may be used to generate plots of the distribution as shown in FIG. 9.

Figure 10:
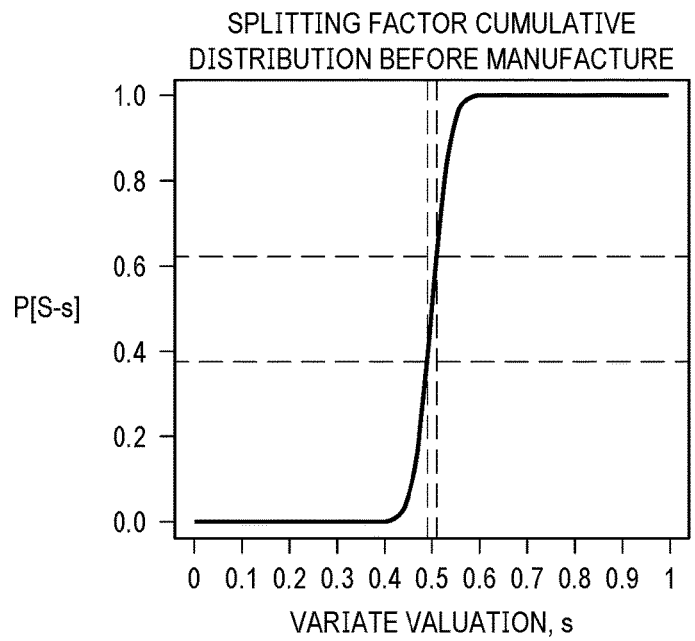
FIG. 10 is a graphical plot.

The cumulative distribution function (cdf) is likewise computed and it is likewise censored. The cdf is depicted in FIG. 10 with dashed lines delineating the appropriate portion of the cdf curve that is applicable to the random variable, $S_Y$. It should be noted that the operable portion of the cdf is approximately linear within the region of interest.

As previously discussed, the actual distribution is censored and is only applicable over the interval ±1%. The leftmost plot in FIG. 9 contains red dashed lines that segregate the figure showing the portion of the distribution that is applicable to $S_Y$ random variable. The rightmost plot shows the portion of the beta distribution that is applicable to Y-splitter. The R source code listing is provided below.

```
x<-(0:1000)/1000;
plot(x,dbeta(x,124.5,124.5),type='l',xaxt='n',ylab='P[S=s]',xlab='Variate
Valuation, s',main='Splitting Factor Distribution before Manufacture')
axis(side=1,at=(0:10)/10,labels=(0:10)/10)
abline(col='red',lty=2,v=0.49)
abline(col='red',lty=2,v=0.51)
abline(h=dbeta(0.49,124.5,124.5),col='red',lty=2)
x<-(4900:5100)/10000;
plot(x,dbeta(x,124.5,124.5),type='l',xaxt='n',ylab='P[S=s]',xlab='Variate
Valuation, s',main='Splitting Factor Distribution before Manufacture')
axis(side=1,at=(49:51)/100,labels=c(0.49,0.5,0.51))
x<-(0:1000)/1000;
plot(x,pbeta(x,124.5,124.5),type='l',xaxt='n',ylab='P[S<=s]',xlab='Variate
Valuation, s',main='Splitting Factor Cummulative Distribution before
Manufacture')
axis(side=1,at=(0:10)/10,labels=(0:10)/10)
abline(col='red',lty=2,v=0.49)
abline(col='red',lty=2,v=0.51)
abline(col='red',lty=2,h=pbeta(0.51,124.5,124.5))
abline(col='red',lty=2,h=pbeta(0.49,124.5,124.5))
```

A similar analysis may be carried out for an example 90:10 four-port couplers. As shown in FIG. 4 the deviation for an example 90:10 four-port coupler is less than or equal to 4%. The mathematical model formulated for such a 90:10 coupler is given in Equations (3) and (4) as $$A_{4o1}=(A_{4i1})(S_C)+(A_{4i0})(1-S_C), \text{ and}$$

$$A_{4oo}=(A_{4i0})(S_C)+(A_{4i1})(1-S_C).$$

The coupling factor, $S_C$, is thus a random variable defined over the real-valued interval [0.0, 1.0]. It should be noted that instead of defining two random variables, one for the 90% coupled signal and another for the 10% coupled signal, it may be more appropriate to define a single random variable since the property of conservation energy dictates the fact that the total amount of energy present at the transmitted through ports must equal the amount of energy that was originally incident to the device less any internal device losses. Internal device loss is specified to be 0.5 dB, equating to approximately a 10.8% loss of total incident signal energy.

Under the assumption that each transmitted through port undergoes an equal amount of internal device loss, it is appropriate to define a single random variable, in this case $S_C$, to represent the deviation from either the 90% or the 10% port. The other port would then utilize a coupling factor of $1-S_C$. For this reason, it is chosen herein to define the random variable with respect to one output port and the 90% coupled port was chosen arbitrarily, although the 10% port could be chosen without any loss of generality. The same discussion as those provided for the Y-splitter apply concerning the formulation of a more accurate model for internal device loss that may require at least the addition of one more random variables to the model.

As is the case for the Y-splitter, the coupling factor is fixed and is thus a deterministic value after the 90:10 coupler has been manufactured. However, before the device is manufactured, it is appropriate to consider the splitting factor to be a random variable since any of a number of different manufacturing, environmental, and random effects can cause the implemented device to exhibit a particular actual splitting factor. For this reason, Equations (3) and (4) can correctly be viewed as a statistical device model.

For the 90:10-Coupler Random Variable Distributed According to the $\beta$-Distribution the random variable, $S_C$, is $\beta$-distributed with parameters $\alpha=49.725$ and $\beta=5.525$ for this example. Specifically, random variables that exist over the real interval [0.0, 1.0] are, by definition, distributed according to the $\beta$-distribution. The pdf of a $\beta$-distribution is given in Equation (24). The only remaining task is to determine the $\beta$-distribution parameters, $\alpha$ and $\beta$. To determine the parameters, it is possible to make use of the well-known relationships in Equations (25) and (26) as is the case for the analysis of the Y-splitter. It can be assumed that the distribution mean is given by the variate of the random variable $S_C$ for the ideal case of the 90:10 coupler where a 90% of the signal energy, less internal device loss, is achieved with zero deviation. This assumption implies that $\mu=0.90$.

Substituting the mean pdf value of 0.90 into Equation (25) and simplifying the resultant expression indicates that $\alpha=9\beta$. Next, the specified maximum deviation of 4% is used as the standard deviation, $\sigma=0.04$. As is the case with the analysis of the Y-splitter, this assumption is an approximation of the true standard deviation since the definition of standard deviation is actually an L2 deviation whereas the typical deviation used in the example is, in all likelihood, an L1 deviation. Applying the result that $\alpha=9\beta$ with Equation (26) yields $$\sigma^2 = \frac{9}{1000\beta + 100}.$$

Figure 11:
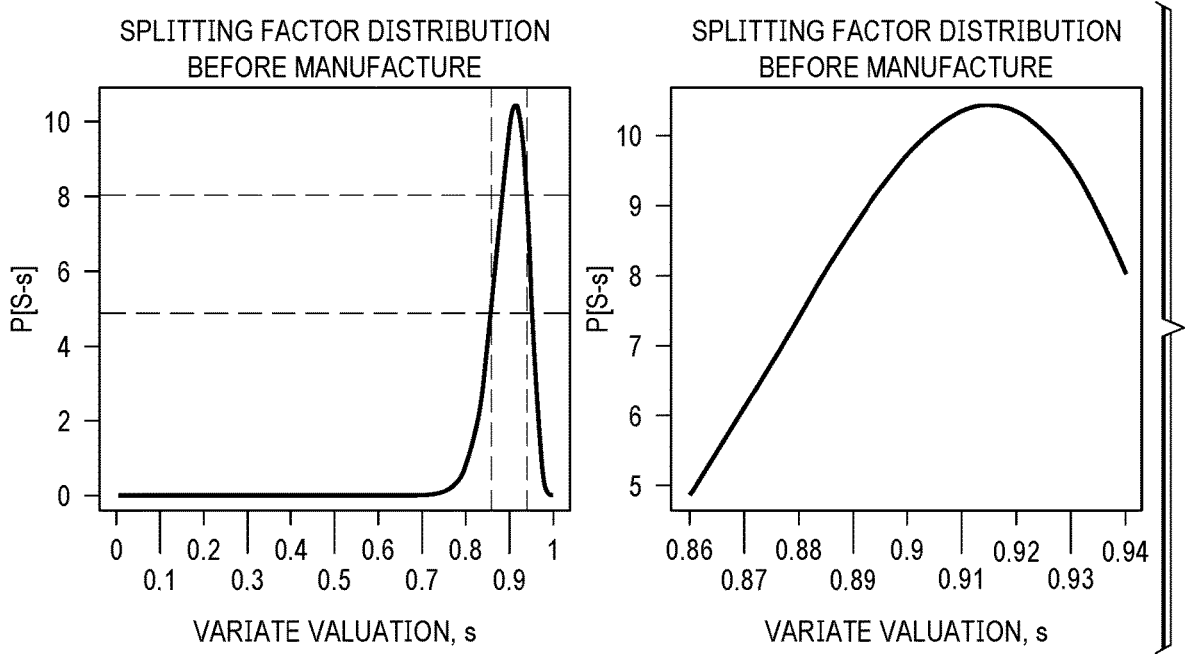
FIG. 11 depicts graphical plots.
Figure 12:
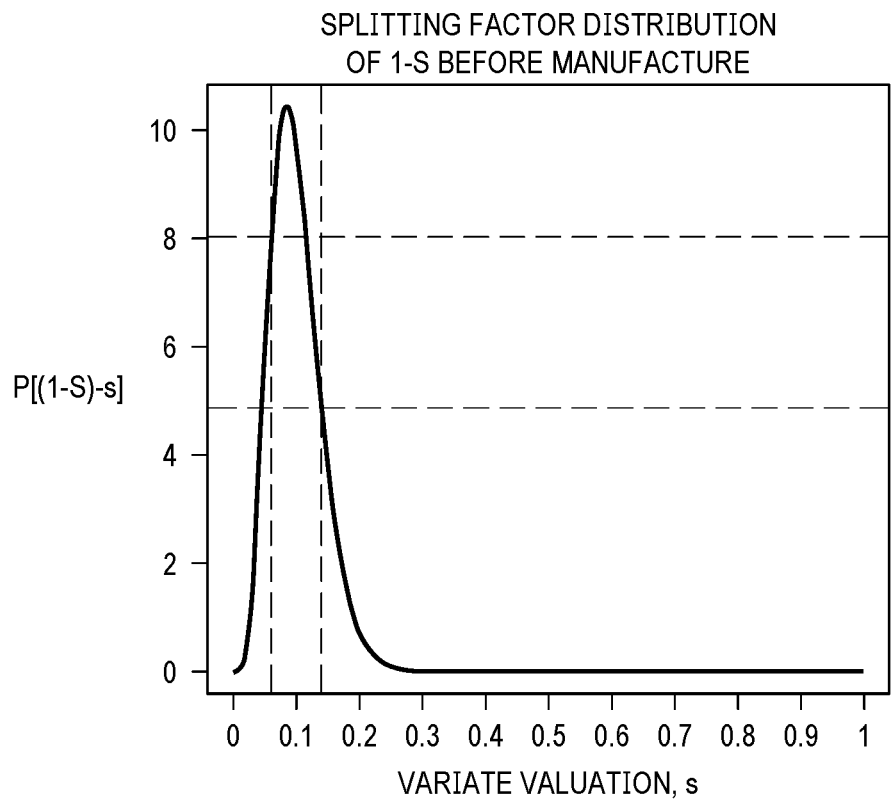
FIG. 12 is a graphical plot.
Figure 13:
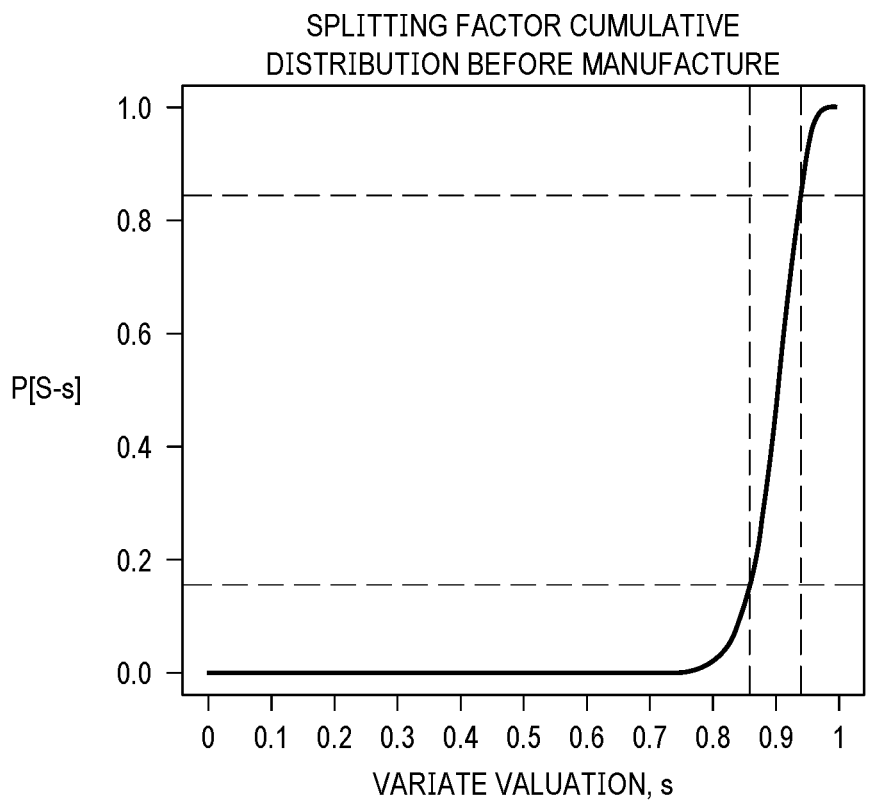
FIG. 13 is a graphical plot.

Substituting $\sigma=0.04$ into this equation and solving for $\beta$ yields $\beta=5.525$. Likewise, using $\alpha=9\beta$ results in $\alpha=49.725$. Using R source code similar to that included above allows the production of plots of the $\beta$-distributions for the random variable $S_C$ with dashed lines indicating the region of interest due to device censoring and an expanded plot showing only the region of interest as shown in FIG. 11. Similarly, a plot of the pdf distribution for the transformed random variable $1-S_C$ is shown in FIG. 12 while the cdf for the 90:10 coupling random variable is given in FIG. 13.

As has been discussed, one advantage appending the two 90:10 couplers to the output of the Y-splitter is to increase the overall variation of the resulting composite Y-splitter while maintaining the 50:50 split of the output signal. As such the incorporation of additional devices with higher individual manufacturing deviations with the Y-splitter will result in a composite Y-splitter with a higher overall deviation reaching or exceeding the design goal of 5% while maintaining the same overall functionality as a Y-splitter. As shown above, the cascade of the standard Y-splitter with two typical four-port 90:10 couplers does indeed produce a composite 3 dB Y-splitter. To validate the hypothesis, a random variable $S_{tot}$ that represents the deviation of the composite splitter shown in FIG. 4 can be defined. First, the expression for variance of a sum of random variables can be derived.

A variance operator can be defined as an operator over a function a statistical model comprising one or more random variables. The variance operator for a single random X is denoted as Var(X). Using the definition of variance with the expected value operator results in Equation (28).

$$\text{Var}(X)=\sigma^2=E[(X-\mu)^2]=E[(X-E[X])^2] \quad (28)$$

A variance of a sum of random variables can also be defined. Consider three independent random variables, X, Y and Z. The variance of a sum of these random variables is a well-known result in statistics and is given by Equation (29).

$$\text{Var}(X+Y+Z)=\text{Var}(X)+\text{Var}(Y)+\text{Var}(Z) \quad (29)$$

An analysis of embodiments of the variation of the composite splitter as disclosed due to manufacturing variations can be determined. As an example, the embodiment of the composite splitter shown in FIG. 4 has an overall deviation of 5.74%. In particular, in order to deduce the deviation of the random variable $S_{tot}$, the variance of this random variable, denoted as $\sigma_{tot}^2$ needs to be computed. The operator denoted as $\text{Var}(S_i)$ can be used where $S_i$ is a random variable present in the model for device $d_i$. The operator can be used to calculate the manufactured deviation using the same approximation as denoted above as $\sigma_{tot}=|\sqrt{\text{Var}(S_{tot})}|$.

The composite splitter deviation can be represented as device $S_{tot}$. Therefore, $\sigma_{tot}^2$ can be calculated as shown in Equation (30). $d_{tot}$ represents the composite splitter comprised of a cascade of devices $\{d_Y, d_{C:A}, d_{C:B}\}$ where the 90:10 coupler in the middle of the cascade is denoted by the subscript A and the rightmost 90:10 coupler is denoted by the subscript B. Since each of the device models in the composite splitter comprises a single random variable, $S_Y$, $S_{C:A}$, and $S_{C:B}$, the composite splitter deviation variance can be computed using the Var( ) operator as given in Equation (29).

$$\text{Var}(S_{tot})=\text{Var}(S_C+S_{C:A}+S_{C:B}) \quad (30)$$

The results of these determinations can be used to evaluate Equation (29), given as $$\text{Var}(S_{tot})=\text{Var}(S_C)+\text{Var}(S_{C:A})+\text{Var}(S_{C:B}) \quad (31)$$

Using the approximation where the expected typical fabricated component deviations are used as the standard deviations of the components with Equation (31) yields:

$$\text{Var}(S_{tot})=(0.01)^2+(0.04)^2+(0.04)^2=0.0033.$$

This allows the calculation of the estimated resultant overall deviation of the composite splitter in Equation (32).

$$\sigma=|\sqrt{\text{Var}(S_{tot})}|=|\sqrt{0.0033}|=0.05744 \quad (32)$$

Therefore, the overall composite splitter deviation is 5.74%.

As shown above, based upon statistical models, overall manufacturing variation effects are increased as compared to the 1% deviation present in a typical 3 dB Y-splitter. In some cases, however, this effect may come at the expense of increased overall insertion loss due to the cumulative effect of the losses due to each component. Both the Y-splitter and the 90:10 couplers have expected internal losses of 0.5 dB each. The overall 1.5 dB loss is likely not a significant issue when the hybrid PUF is operated in classical mode since the (e.g., constant amplitude CW) beam driving the input can be increased in amplitude to overcome effects due to internal loss. However, increasing the internal loss may have an effect when the PUF is operated is quantum mode.

When the PUF is operating in quantum mode, embodiments of the composite splitter may be excited with a single heralded photon that is always in a quantum state of exactly $|0\rangle$, due to the fact that the location observable is used to carry quantum information and in the ideal case with no deviation present, the composite 3 dB splitter evolves the quantum state to be in perfect superposition since it comports with a Hadamard operator in the ideal case as given by Equation (33).

$$H|0\rangle = \frac{1}{\sqrt{2}}\begin{bmatrix} 1 & 1 \\ 1 & -1 \end{bmatrix}\begin{bmatrix} 1 \\ 0 \end{bmatrix} = \frac{1}{\sqrt{2}}|0\rangle + \frac{1}{\sqrt{2}}|1\rangle \quad (33)$$

Because the probability amplitudes for each resultant basis state have the real value $(1/\sqrt{2})$, the probability that a negative or positive voltage is measured at the output of each detector for a given composite splitter is computed in accordance with Born's rule as $$P[|0\rangle \text{ is measured}] = \left(\frac{1}{\sqrt{2}}\right)^2 = \frac{1}{2}, \text{ and}$$

$$P[|1\rangle \text{ is measured}] = \left(\frac{1}{\sqrt{2}}\right)^2 = \frac{1}{2}.$$

However, due to the overall device deviation of the Hadamard operator, the actual quantum operator may be a "noisy" Hadamard gate denoted by $H_{dev}$. As discussed in detail in [Tho:20], the actual quantum operator transfer matrix can be expressed as $$H_{dev} = \qquad (34)$$

$$H + E_{dev} = \frac{1}{\sqrt{2}}\begin{bmatrix} 1 & 1 \\ 1 & -1 \end{bmatrix} + \begin{bmatrix} \epsilon_{00} & \epsilon_{01} \\ \epsilon_{10} & \epsilon_{11} \end{bmatrix} = \frac{1}{\sqrt{2}}\begin{bmatrix} 1+\epsilon_{00} & 1+\epsilon_{01} \\ 1+\epsilon_{10} & -1+\epsilon_{11} \end{bmatrix}$$

Due to the conservation of energy as well as other aspects of quantum electrodynamics, the matrices H and $H_{dev}$ are unitary. Useful results arising from the unitarity of the matrices is that their determinates are all unity-valued and their complex transposes are equal to their inverses. Because quantum computational operations are expressed in terms of direct matrix products of cascaded operators, it is useful to derive a model of the form $H_{dev}=HU_{dev}$ so that the operation of the composite splitter in the quantum realm can be expressed in standard quantum computational notation.

A quantum computation model for embodiments of a composite splitter can be expressed as a quantum algorithm representing $H_{dev}=HU_{dev}$ where $U_{dev}$ is a unitary matrix of the form $$U_{dev} = \frac{1}{\sqrt{2}}\begin{bmatrix} \sqrt{2}+\epsilon_{00}+\epsilon_{10} & \epsilon_{01}+\epsilon_{11} \\ \epsilon_{00}-\epsilon_{10} & \sqrt{2}+\epsilon_{01}-\epsilon_{11} \end{bmatrix}.$$

Here, the objective is to transform the expression $H_{dev}=H+E_{dev}$ into the expression $$H_{dev}=HU_{dev}.$$

$$H_{dev}=H+E_{dev}$$

$$H_{dev}=H+IE_{dev} \qquad (35)$$

Using the unitary property that $HH^\dagger=I$, and substituting this expression into Equation (34), results in Equation (36).

$$H_{dev}=H+HH^\dagger E_{dev} \qquad (36)$$

Factoring H from the two terms on the right-side of Equation (36) results in Equation (37).

$$H_{dev}=H(I+H^\dagger E_{dev}) \qquad (37)$$

Thus, the general form of $U_{dev}$ is the expression within the parentheses on the right side of Equation (37). Substituting the explicit form of the matrices describing $U_{dev}$ and simplifying leads to the result in Equation (38).

$$I+H^\dagger E_{dev} = \begin{bmatrix} 1 & 0 \\ 0 & 1 \end{bmatrix} + \frac{1}{\sqrt{2}}\begin{bmatrix} 1 & 1 \\ 1 & -1 \end{bmatrix}\begin{bmatrix} \epsilon_{00} & \epsilon_{01} \\ \epsilon_{10} & \epsilon_{11} \end{bmatrix} \qquad (38)$$

$$= \begin{bmatrix} 1 & 0 \\ 0 & 1 \end{bmatrix} + \frac{1}{\sqrt{2}}\begin{bmatrix} \epsilon_{00}+\epsilon_{10} & \epsilon_{01}+\epsilon_{11} \\ \epsilon_{00}-\epsilon_{10} & \epsilon_{01}-\epsilon_{11} \end{bmatrix}$$

$$= \begin{bmatrix} 1+\frac{\epsilon_{00}+\epsilon_{10}}{\sqrt{2}} & \frac{\epsilon_{01}+\epsilon_{11}}{\sqrt{2}} \\ \frac{\epsilon_{00}-\epsilon_{10}}{\sqrt{2}} & 1+\frac{\epsilon_{01}-\epsilon_{11}}{\sqrt{2}} \end{bmatrix}$$

$$= \frac{1}{\sqrt{2}}\begin{bmatrix} \sqrt{2}+\epsilon_{00}+\epsilon_{10} & \epsilon_{01}+\epsilon_{11} \\ \epsilon_{00}-\epsilon_{10} & \sqrt{1}+\epsilon_{01}-\epsilon_{11} \end{bmatrix}$$

As another quantum computation model for a composite splitter, the composite splitter can equivalently be expressed as a quantum algorithm representing $H_{dev}=U_{dev}H$ where $U_{dev}$ is the same unitary matrix as that of Equation (38), $$U_{dev} = \frac{1}{\sqrt{2}}\begin{bmatrix} \sqrt{2}+\epsilon_{00}+\epsilon_{10} & \epsilon_{01}+\epsilon_{11} \\ \epsilon_{00}-\epsilon_{10} & \sqrt{2}+\epsilon_{01}-\epsilon_{11} \end{bmatrix}.$$

In this case, the objective is to transform the expression $H_{dev}=H+E_{dev}$ into the expression $H_{dev}=U_{dev}H$. It is observed that matrix addition is an associative operation, thus $$H_{dev}=H+E_{dev}=E_{dev}+H$$

$$H_{dev}=E_{dev}I+H \qquad (39)$$

Using the unitary property that $H^\dagger H=I$, and substituting this expression into Equation (38), results in Equation (40).

$$H_{dev}=E_{dev}H^\dagger H+H \qquad (40)$$

Factoring H from the two terms on the right-side of Equation (40) results in the following expression.

$$H_{dev}=(E_{dev}H^\dagger I)H \qquad (41)$$

Once again, the fact that matrix addition is associative can be used to rewrite Equation (41) as Equation (42).

$$H_{dev}=(I+E_{dev}H^\dagger)H \qquad (42)$$

Figure 14:
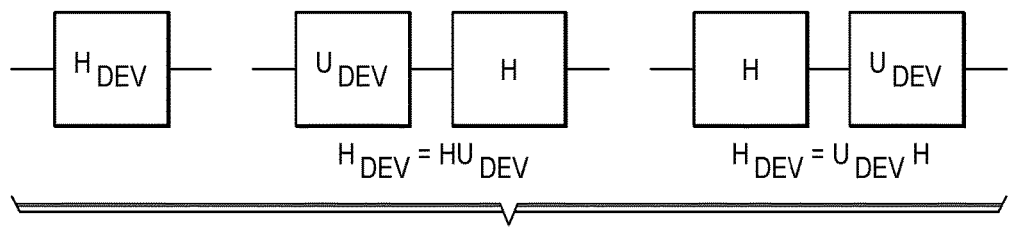
FIG. 14 is a block diagram of a model for an embodiment of a component chain.

It can be observed that the expression in the parentheses of Equation (42) is $U_{dev}$ which was shown to be explicitly defined in Equation (38) thus proving the result through deduction. The composite splitter can be expressed as a quantum algorithm representing $H_{dev}=HU_{dev}=U_{dev}H$. The standard graphical form of the quantum algorithmic models for an embodiment of a composite splitter is shown in FIG. 14.

Using the result above, some potential forms of the quantum transfer matrix $U_{dev}$ can be derived for embodiments of the composite splitter when a maximum deviation of 5.74% is realized. It is noted that, in theory, an infinite number of such matrices can exhibit this maximum deviation since it reflects a difference in the probability amplitudes rather than an absolute value of a single probability amplitude. Let the evolution of an incident photon with quantum state $|0\rangle$ via the composite splitter transfer matrix be represented as given in Equation (43).

$$H_{dev}|0\rangle = \left(\frac{1}{\sqrt{2}}+d_0\right)|0\rangle + \left(\frac{1}{\sqrt{2}}+d_1\right)|1\rangle \qquad (43)$$

In Equation (43) the ideal case with no deviation results in the composite splitter transfer matrix taking the form, $H_{dev}=H$, implying that $d_0=d_1=0$. For the case where the maximal deviation of 5.74% results in a maximum probability that $|0\rangle$ is detected:

$$\left|\frac{1}{\sqrt{2}}+d_0\right|^2 = \frac{1}{2}+0.0574.$$

Solving this expression for $d_0$ yields $$d_0 = \left|\sqrt{0.5574}\right| - \frac{1}{\sqrt{2}} = 0.0395.$$

Find $d_1$, using the relationship $$\left|\frac{1}{\sqrt{2}}+d_0\right|^2+\left|\frac{1}{\sqrt{2}}+d_1\right|^2=1$$

Substituting $d_0=0.0395$ into the above equation and solving for $d_1$ results in $$\left|\frac{1}{\sqrt{2}}+d_1\right|^2=1-\left|\frac{1}{\sqrt{2}}+0.0395\right|^2=0.44258,$$

$$d_1=\sqrt{0.44258}-\frac{1}{\sqrt{2}}=-0.041841.$$

In this case, $$H_{dev}|0\rangle=\left(\frac{1}{\sqrt{2}}+0.0395\right)|0\rangle+\left(\frac{1}{\sqrt{2}}-0.0418\right)|1\rangle.$$

Likewise, for the case where the probability of detecting $|1\rangle$ is maximized $$H_{dev}|0\rangle=\left(\frac{1}{\sqrt{2}}-0.0418\right)|0\rangle+\left(\frac{1}{\sqrt{2}}+0.0395\right)|1\rangle.$$

In general, $d_0$ can be expressed as a function of $d_1$ using the expression in Equation (44).

$$d_0=\sqrt{1-\left|\frac{1}{\sqrt{2}}+d_1\right|^2}-\frac{1}{\sqrt{2}} \tag{44}$$

Figure 15:
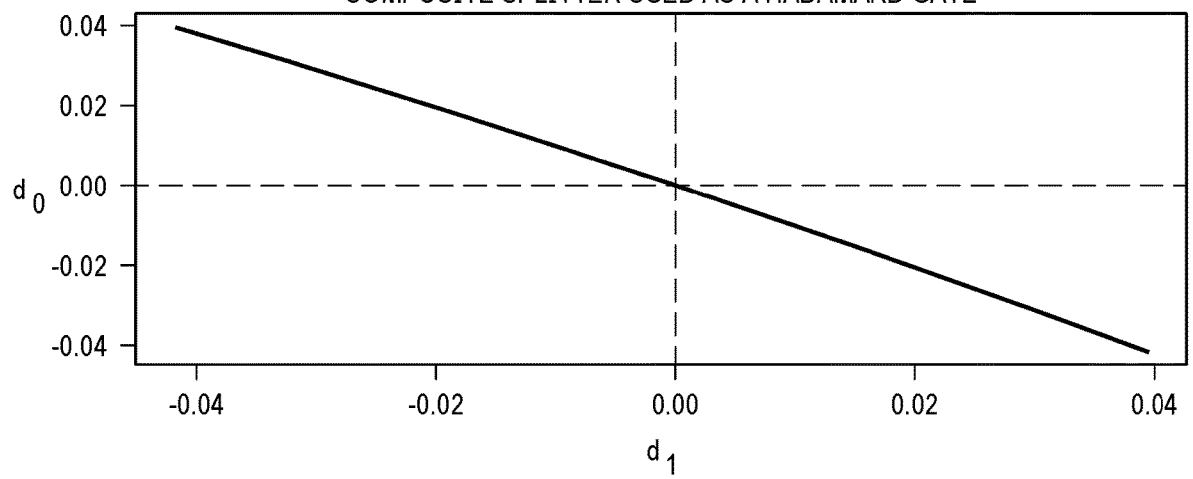
FIG. 15 is a graphical plot.

FIG. 15 contains a plot of Equation (44) showing how $d_0$ varies with respect to $d_1$ when embodiment of the composite splitter are manufactured with a range of deviations up to and including the maximum deviation. The intersection of the dashed lines occurs when the deviations are both zero-valued corresponding to the case when $H_{dev}=H$. The left most point of the curve corresponds to the case where the probability of detecting $|0\rangle$ is maximized and the rightmost point corresponds to the case where the probability of detecting $|1\rangle$ is maximized.

Figure 16:
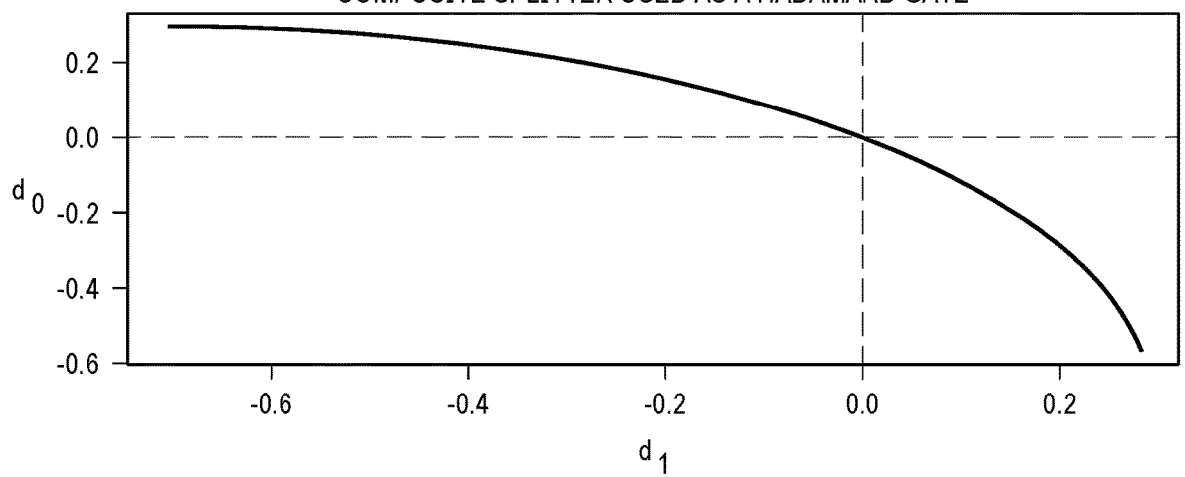
FIG. 16 is a graphical plot.

Although the curve in FIG. 15 appears to be linear, examination of Equation (44) indicates that it clearly is not. When the maximum deviation is extended to the extreme limits, the non-linearity becomes more apparent. FIG. 16 shows the relationship of $d_0$ with respect to $d_1$ at the extreme points. At the extreme far left side of the plot, the $(d_0,d_1)$ pair corresponds to (0.292, −0.707) corresponding to extreme (and incorrectly functioning case) of $H_{dev}|0\rangle=|0\rangle$. Likewise, at the extreme right side of the plot, the $(d_0,d_1)$ pair corresponds to (−0.707, 0.292) corresponding to extreme (and incorrectly functioning case) of $H_{dev}|0\rangle=|1\rangle$. The dashed lines intersect at the point where $(d_0,d_1)=(0,0)$ corresponding to the ideally functioning case where $H_{dev}=H$.

As the deviations both approach zero when the embodiment of the PUF are operating in quantum mode, the probability that a $|0\rangle$ or a $|1\rangle$ is detected both approach 0.5. In order for the PUF to determine that a conventional response bit is zero, the $d_0$ probability amplitude value corresponding to a $|0\rangle$ measurement must be positive and likewise for the PUF to determine that a conventional response bit is one, the $d_1$ probability amplitude value corresponding to a $|1\rangle$ measurement must be negative. For the case where $(d_0,d_1)$ is very close to (0,0), enough photons must be detected to accurately estimate the square of the probability amplitude. This case requires that a histogram (or the like) is accumulated that counts the number of times a $|0\rangle$ has been detected, denoted as $N_0$, or likewise, that a $|0\rangle$ is detected, denoted as $N_1$. After a suitable number of counts have been accumulated, denoted as $N_{tot}$, the larger number among $(N_0,N_1)$ indicates whether the PUF bit was a zero or a one. Specifically, for a sufficiently large value of $N_{tot}$, Equation (45) gives the relationship used to detect the correct QPUF response bit.

$N_0>N_1$, QPUF response bit is 0

$N_1>N_0$, QPUF response bit is 1 $\tag{45}$

It may be useful to discuss how large $N_{tot}$ may be for a reliable measurement to occur. However, the guiding framework for choosing a sufficiently large $N_{tot}$ value is based on the relationship between the measurement values $(N_0,N_1, N_{tot})$ and the subjective probabilities that a $|0\rangle$ or $|1\rangle$ will be measured based upon the square of the magnitude of the evolved quantum state due to Born's rule. If the evolved qubit state due to the transformation provided by the composite splitter is denoted as $H_{dev}|0\rangle=\alpha|0\rangle+\beta|1\rangle$, Born's rule states that the subjective probability that a $|0\rangle$ is measured is $P[|0\rangle$ is measured$]=|\alpha|^2$ and likewise, the subjective probability that a $|1\rangle$ is measured is $P[|1\rangle$ is measured$]=|\beta|^2$. The guiding principle for choosing an appropriate value of $N_{tot}$ is given in Equations (46) and (47).

$$P[|0\rangle\text{ is measured}]=|\alpha|^2=\lim_{N_{tot}\to\infty}\frac{N_0}{N_{tot}} \tag{46}$$

$$P[|1\rangle\text{ is measured}]=|\beta|^2=\lim_{N_{tot}\to\infty}\frac{N_1}{N_{tot}} \tag{47}$$

As discussed above, the primary security concerns for a PUF are repeatability and avoidance of collisions. Formal definitions are provided for each security property followed by a discussion and analysis for embodiments of a PUF and PUF system as disclosed.

A PUF is said to exhibit the property of repeatability if it consistently responds with the same response signature for each different challenge word for which it was designed to issue a response. Repeatability for embodiments of the PUF and PUF system as disclosed may be dependent upon the composite splitter components maintaining substantially the same manufactured deviations after fabrication, ensuring that the challenge signals are consistent, and that changes in the operational environment do not affect these two properties.

In terms of the input signals for the case of classical operation, embodiments may assume that the composite splitters are excited with constant amplitude incident CW laser beams at a fixed amplitude, $A_{inc}$. It is expected that a range of amplitudes will be determined in laboratory measurements for which the same responses can be retrieved and to ensure a suitable SNR range for the post-detection electronics. The response word is in terms of classical bits that are set to logic-0 or logic-1 based upon the differential amplifier output being either a negative or positive voltage. In certain cases it may only be necessary that the voltage produced in response to a challenge word be detected as positive or negative with respect to ground; the voltage amplitude does not matter. A nominal 3 dB splitting value may be chosen for certain embodiments in an attempt to maximize signal-to-noise (SNR) ratio for the detected signal. That is, a 3 dB split may ensure that the produce positive and negative voltages each deviate in magnitude as much as possible. Increasing the SNR of the converted voltages derived from the photodetector outputs will enhance repeatability. Because the composite splitter may be able to tolerate relatively large input laser beam amplitudes, degradation in repeatability due to SNR issues may be reduced or eliminated.

Another important factor in repeatability may be the frequency-dependent effects with respect to manufactured device deviations. Slight changes in the input PUF excitation signal frequencies can affect the observed deviations. The effect of wavelength differences with respect to device deviation for standard silicon photonic implementations of the 3 dB splitter and the 90:10 four-port coupler can be modeled using standard photonic IC design tools and the deviations predicted by these simulations can be reasonably well-matched in fabricated devices. Based on the frequency dependent deviations, it is thus likely the case that overall composite splitter deviation effects can be increased by operating embodiment of the PUF at the extreme edges of the transmission band. In the case of embodiments of the PUF, increasing the deviation effects is advantageous provided that their probability distributions likewise remain present. It is also possible that statistically significant variations can also be obtained with different incident laser beam polarizations.

In terms of repeatability, when operated in the quantum realm, there may be a dependence upon the number of repeated measurements, $N_{tot}$, for each individual PUF interrogation. As previously described, quantum operation may require that a number of measurements be made so that a histogram (or the like) can be internally constructed that accumulates the number of measurements resulting in a logic-0, $N_0$, resulting from a measured photodetector output (converted to a voltage) voltage and likewise, the number of measurements resulting in a logic-1, $N_1$, resulting from a measured photodetector output from the alternative output port. Additionally, it may be necessary to account for the case where injected photons are not detected due to insertion loss. This is accomplished by the requirement that photodetector output signals will only be counted if they occur within the same coincidence window as that for a corresponding idler photon detection using techniques for coincidence measurements.

According to embodiments, the minimum number of required measurements to resolve the observed probabilities, resulting from Born's rule, to n digits of accuracy, $n_{digits}$, is $N_{tot}=1.292 \, PA(n_{digits})$, where $PA(n_{digits})$ represents the results of a statistical power analysis study given the desired number of significant digits of accuracy, $_{digits}$. To illustrate, assume that the total number of required photons to be injected into the composite splitter is represented by $N_{tot}$ where the expression for calculating $N_{tot}$ is given by Equation (48).

$$N_{tot} = PA(n_{digits}) + N_{loss}(n_{digits}) \tag{48}$$

$N_{loss}(n_{digits})$ is the number of photons that are not detected or added to the measurement total due to internal device loss or due to dark counts and is a function of the number of digits of desired accuracy if the actual subjective probabilities, $P[|0\rangle \text{ is measured}] = |\alpha|^2$ and $P[|1\rangle \text{ is measured}] = |\beta|^2$, were to be estimated with $n_{digits}$ digits of accuracy as approximated by $P[|0\rangle \text{ is measured}] N_0/N_{tot}$ and $P[|1\rangle \text{ is measured}] \approx N_1/N_{tot}$. Likewise, the function $PA(n_{digits})$ is the result of a statistical power analysis for a particular standard error value that is in turn based on the desired number of digits of accuracy, $n_{digits}$. It is noted that, as an alternative to a power analysis study, an appropriate sample size can also be determined by selected a desired standard error given the assumed distributions and statistical parameters, followed by solving the standard error equation for the implied sample size, $N_{tot}$. This may offer a simple way to estimate required sample sizes.

Embodiments of the composite splitter as disclosed has a total combined insertion loss of 1.5 dB assuming the incident photons have TE polarization and disregarding any loss due to interconnecting waveguides. Therefore, on average, there will be a number of photons originally incident on the input port of the composite splitter that internally convert to some other form of energy that is not measurable to account for the composite device loss value of 1.5 dB. To compute the percentage of photons that are not measured due to device loss, the loss can be viewed as a negative gain value, $G_{loss}$, followed by considering $P_{loss}=1-G_{loss}$ as the linear percentage of loss. First, the linear gain value is computed by solving Equation (48) for $G_{loss}$.

$$-1.5 = 10\log_{10}(G_{loss}) \tag{49}$$

$$G_{loss} = 10^{-\frac{1.5}{10}} = 0.70795$$

This results in the percentage of photons not detected due to internal composite splitter device loss as $P_{loss}=1-G_{loss}=1-0.70795=0.2921 \rightarrow 29.2\%$. Therefore, $$N_{tot} = PA(n_{digits}) + N_{loss}(n_{digits}),$$

$$= PA(n_{digits}) + 0.292 PA(n_{digits}),$$

$$= 1.292 PA(n_{digits}).$$

The quantity $N_{tot}$ represents the results of a statistical power analysis study that allows one to compute a sample size based on an assumed standard error. If $n_{digits}$ is selected to be three, then the resulting estimates, $P[|0\rangle \text{ is measured}]$ and $P[|1\rangle \text{ is measured}]$, are estimated for a computed as $N_{tot}$ value as $N_0/N_{tot}$ and $N_1/N_{tot}$ respectively, and will not have an error of more than ±0.001 from the true values of $P[|0\rangle$ is measured$]=|\alpha|^2$ and $P[|1\rangle$ is measured$]=|\beta|^2$. For three digits of accuracy, a power analysis indicates that 2,705,845 photons must be generated.

Turning now to collision avoidance, given a collection of N different PUFs of the same design that are implemented on N devices with the same functionality and manufacturing parameters, if any two of the N PUFs have identical challenge/response pairs, they are said to collide. Collision avoidance is the security property that given a collection of N PUFs, the probability that any two collide is less than some threshold value, $P_{threshold}$. Ideally, $P_{threshold}$ is zero-valued.

Collision avoidance analysis is performed for disclosed embodiments of a PUF system operating in both the classical and quantum modes of operation. This analysis is applicable to both classical and quantum operational modes since it is based largely on electronic portions of the PUF system and assumes perfect repeatability. With respect to the quantum mode, the analysis assumes that enough samples per measurement are taken to ensure repeatability and in the classical mode, it is assumed that the excitation laser beam amplitudes are sufficient to overcome SNR issues in the amplifier stage of the electronics.

In classical mode, the (e.g., differential) amplifier section of embodiments is essentially making a decision as to whether the converted voltage arising from the top output port of the composite splitter is greater than or less than that of the corresponding voltage arising from the detected output from the bottom output port of the splitter. In the quantum realm this decision is made based upon comparisons of total count numbers as given in Equation (45). In both the classical and the quantum operational cases, the functionality of embodiments of the PUF system can be modeled as the outcome of a Bernoulli trial since the outcome of a measurement at the output of the amplifier stage is binary; either a positive or a negative voltage will result. When the PUF is designed to comprise M total composite splitters with associated electronics, the PUF output response word will be in the form of M conventional bits that are all modeled a outcomes of statistically independent Bernoulli trials. Thus, M outcomes of independent Bernoulli trials for each PUF system response word may be obtained.

The security property of collision avoidance is then to ask the question, given N different manufactured hybrid PUFs, each with a response word size of M bits, what is the probability that any two of the N QPUFs will provide identical response words? To answer this question, it is noted that the collection of N different M-bit response words from different PUFs, will have a binomial distribution since the collection is a sum of Bernoulli trials. It is also noted that as M approaches infinity, the binomial distribution approaches the Gaussian or normal distribution. Thus, collision analysis may be undertaken by selecting a fixed value of N, the total number of different PUF circuits in a population, and varying the PUF response word size M such that an acceptably small probability of collision results.

Figure 17:
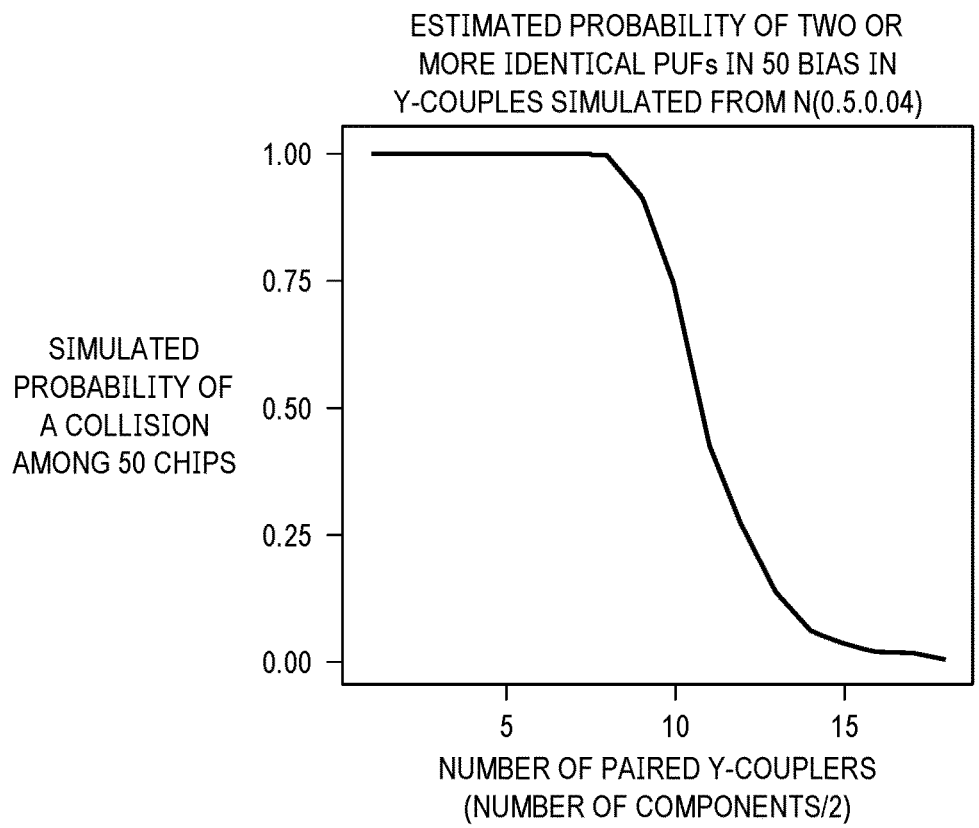
FIG. 17 is a graphical plot.
Figure 18:
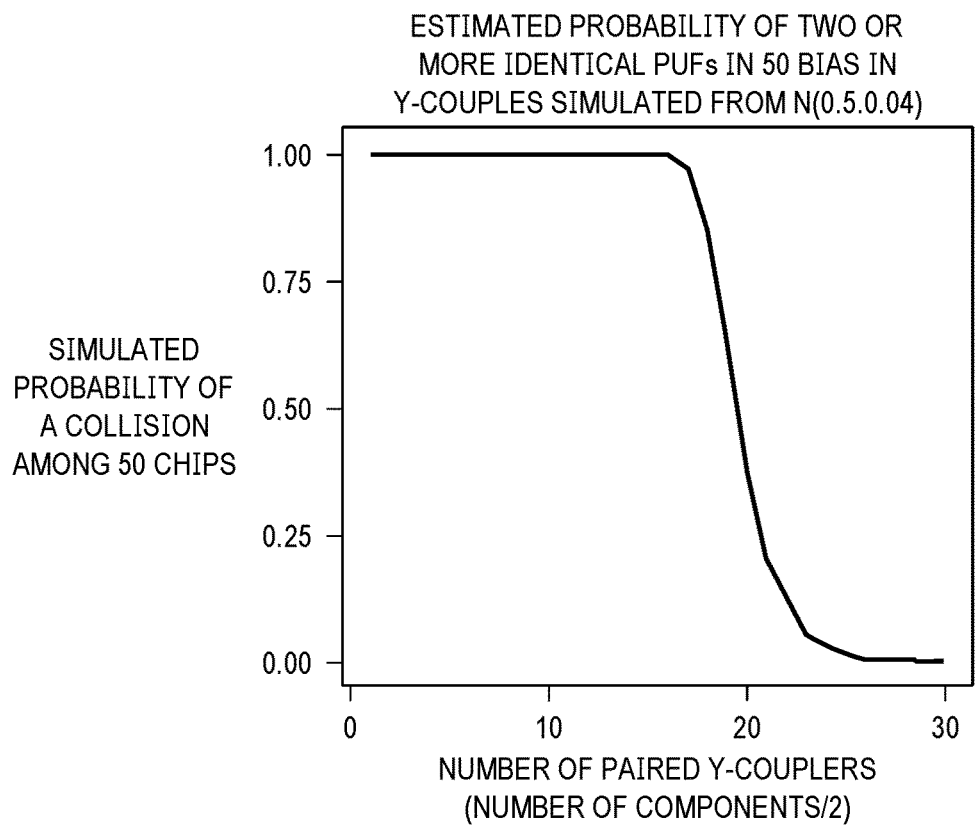
FIG. 18 is a graphical plot.

This analysis can be undertaken, for example, in the R statistical language. Results for two cases, M=50 different PUF circuits and M=1000 different PUF circuits are presented. Intuitively, it is clear that as the number of bits, M, in each PUF response word increases, the likelihood that any two response words are the same for two PUFs in the population will decrease. However, as the population size, N, increases, there will likewise be a higher probability that two PUF response words from any two PUF circuits in the population will collide for a fixed vale of M. FIG. 17 shows the results of this analysis for a population size of N=50 with the number of bits, M, being varied. FIG. 18 shows the results of this analysis for a population size of N=1000 with the number of bits, M, being varied. The normal distribution average is 0.5 which assumes that the deviation distributions, the) β-distributions as previously described, are symmetric about the mean, or in other words, that no biases are present.

The standard deviation of the normal distribution is chosen as 4% in this analysis, but this value is irrelevant as long as it is larger than 0 since it is only necessary that a Bernoulli trial outcome is accurately measured. In other words, it turns out that this deviation does not change the analysis results as long as it is greater than 0. At a deviation of 0, the ideal case, the normal distribution becomes a Dirac-delta function; however, this case will practically never, or at least very rarely occur in an actual manufactured QPUF circuit. The reason that the deviation value does not matter for this analysis is because it is assumed that the electronics always accurately finds the amplifier or counter values and correctly compares them if a suitable SNR is present. Clearly, it may be desired that the deviation should be large enough to overcome the SNR issues previously discussed for classical mode operation, and likewise the sample size per measurement must be large enough to ensure accurate estimates of detector probabilities are found.

In the quantum mode, larger deviations will in turn require fewer samples to be accumulated per measurement since fewer significant digits of accuracy are required to differentiate the two basis state probability amplitudes. For example, a design goal for the quantum mode of operation may be to use a composite splitter with as large a manufacturing deviation as possible while also minimizing device loss and dark count. The results in FIGS. 17 and 18 indicate a bit size, M, of 16 bits for a population size of 50 devices and a bit size of 26 bits for a population size of 1000 devices to ensure a probability of collision less than 0.05.

It will be noted as well that the standard mechanism for creating a PUF challenge is to have the querying device create a nonce and include that value in the initial challenge message. While that may possibly be sufficient to satisfy the stipulation that the CRP must employ unpredictable nonces, the security of this CRP then becomes entirely dependent on the trustworthiness of the challenge producer. If the challenger is an adversary, then it can create challenge messages with nonces that are designed to elicit responses that can be used to flush out statistically relevant information from the respondent. Thus, it is also desirable to have a system that can substantially guarantee the entropic nature of any CRP message exchanges.

In addition, in order to decrease the likelihood of an ML-based adversary being able to successfully model a legitimate devices' PUF values, it is also desirable to implement some method for limiting the number of CRP queries to which a given device will respond (whether legitimate or not). This limitation can practically only be enforced on the part of the responding device, since there is no way to control who may initiate a CRP query.

There are several methods that could be used to accomplish both of these requirements. A first such method includes requiring that the response to any challenge must also include a nonce that is generated by the responding device. Because this nonce must be made public, it should thus be required that it is guaranteed to be unpredictable. A quantum-effect based entropy source can be used to meet this requirement and it has the added advantage that this quantum source of entropy function can be accomplished using the structure already outlined earlier. Specifically, the output of the photonic Hadamard gate described above will produce quantum-derived entropy. That entropy can be sampled, extracted and included in each response.

If all response messages must include a quantum entropy-derived nonce value, then a simple way to reduce the overall number of CRP message responses is to throttle back the internal source of quantum entropy that can be produced. In this manner, achieve the desired functionality of always using unpredictable nonces as a part of the CRP may be achieved in a simple and effective manner.

Another mechanism that can be used in embodiments of this CRP protocol to limit the ability of adversarial querying of the legitimate device is to require that all legitimate challenges must employ cryptographically signed messages. Of course, this may require that the legitimate challenger must share a secret with the legitimate respondent. However, this shared secret may already be a requirement if the challenger is going to be able to verify the legitimate devices' responses. This mechanism also carries along with it another advantage in that the challenger can simply ignore any illegitimate challengers' queries, thus further limiting the number of messages that can be used by an ML-based adversary. Accordingly, if the device in question is queried by an adversary who does not provably possess the ability to verify the response properly, it is simply ignored.

Although the invention has been described with respect to specific embodiments thereof, these embodiments are merely illustrative, and not restrictive of the invention. The description herein of illustrated embodiments of the invention, including the description in the Summary, is not intended to be exhaustive or to limit the invention to the precise forms disclosed herein (and in particular, the inclusion of any particular embodiment, feature or function within the Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein and throughout the claims that follow, the meaning of "in" includes "in" and "on" unless the context clearly dictates otherwise.

REFERENCES

The following references will be useful to an understanding of the disclosure and are fully incorporated herein by reference in their entirety for all purposes and are referred to elsewhere herein by their shorthand specified hereinbelow.

[AFS:20] M. Akriotou, A. Fragkos, and D. Syvridis, Photonic Physical Unclonable Functions: From the Concept to Fully Functional Device Operating in the Field, arXiv: 2002.12618 [cs.CR], https://arxiv.org/pdf/2002.12618.pdf, (last accessed Mar. 21, 2021).

[AM:88] P. Antognetti and G. Massobrio, Semiconductor Device Modeling with SPICE, McGraw-Hill, 1988.

[Bau:83] D. W. Bauder, An Anti-counterfeiting Concept for Currency Systems, *Technical Report*, PTK-11990, Sandia National Labs, Albuquerque, NM, 1983.

[BDM:02] K. A. Bowman, S. G. Duvall, and J. D. Meindl, Impact of Die-to-Die and Within-Die Parameter Fluctuations on the Maximum Clock Frequency Distribution for Gigascale Integration, *IEEE Journal of Solid-State Circuits*, 37(2), February 2002, pp. 183-190.

[Ber:68] E. R. Berlekamp, Algebraic Coding Theory, McGraw-Hill, 1968.

[BN:99] D. S. Boning and S. Nassif, Models of Process Variations in Device and Interconnect, in A. Chandrakasan, W. Bowhill, and F. Fox (eds.), Design of High Performance Microprocessor Circuits, chapter 6, IEEE Pres, 2000.

[GC+:02] B. Gassend, D. Clarke, M. van Dijk, and S. Devadas, Silicon Physical Random Functions, in proc.

ACM Conf. on Computer and Communications Security, November 2002, pp. 148-160.

[HCM+:08] N. R. Huntoon, M. P. Christensen, D. L. MacFarlane, G. A. Evans, and C. S. Yeh, Integrated Photonic Coupler Based on Frustrated Total Internal Reflection, *Applied Optics,* 47(5682), 2008.

[KA+:19] A. R. Korenda, F. Afghah, B. Cambou, and C. Philabaum, A Proof of Concept SRAM-based Physically Unclonable Function (PUF) Key Generation Mechanism for IoT Devices, in proc. Workshop on Security, Trust, and Privacy in Emerging Cyber-Physical Systems, 2019.

[KVL:11] A. V. Krishnamoorthy, X. Zheng, G. Li, J. Yao, T. Pinguet, A. Mekis, H. Thacker, I. Shubin, Y. Luo, K. Raj, and J. E. Cunningham, Exploiting CMOS Manufacturing to Reduce Tuning Requirements for Resonant Optical Devices, *IEEE Photonics Journal,* April 2011, pp. 567-579.

[LHM+:13] K. Liu, H. Huang, S. X. Mu, H. Lin, and D. L. MacFarlane, Ultra-compact Three-Port Trench-Based Photonic Couplers in Ion-Exchanged Glass Waveguides, *Optics Communications,* 309, 2013, pp. 307-312.

[MKP:08] M. Majzoobi, F. Koushanfar, and M. Potkonjak, Lightweight Secure PUFs, in proc. *IEEE/ACM International Conference on Computer-Aided Design,* November 2008, pp. 670-673.

[Nod:97] K. Noda, 2.9 µm Embedded SRAM Cell with Co-Salicide Directstrap Technology for 0.18-µm High-Performance CMOS Logic, in proc. *IEDM Technical Digest,* 1997, pp. 847-850.

[Pap:01] R. Pappu, Physical One-Way Functions, *PhD Thesis,* Massachusetts Institute of Technology, 2001.

[Pap:02] R. Pappu, B. Recht, J. Taylor, and N. Gershenfeld, Physical One-Way Functions, *Science,* vol. 297, 2002.

[PM:15] R. Plaga and D. Merli, A New Definition and Classification of Physical Unclonable Functions, in proc. *Second Workshop on Cryptography and Security in Computing Systems,* January 2015, pp. 7-12.

[RH+:13a] U. Rührmair, C. Hilgers, S. Urban, A. Weiershäuser, E. Dinter, B. Forster, and C. Jirauschek, Revisiting Optical Physical Unclonable Functions, *Cryptology ePrint Archive,* Report 2013/215, April 2013, https://eprintiacr.org/eprint-bin/versions.pl?entry=2013/215, last accessed Mar. 21, 2021.

[RH+:13b] U. Rührmair, C. Hilgers, S. Urban, A. Weiershäuser, E. Dinter, B. Forster, and C. Jirauschek, Optical PUFs Reloaded, *Cryptology ePrint Archive,* Report 2013/215, May 2013, https://eprint.iacr.org/eprint-bin/versions.pl?entry=2013/215, last accessed Mar. 20, 2021.

[RH:14] U. Rührmair, and D.E. Holcomb, PUFs at a Glance, in proc. *Design, Automation and Test in Europe,* March 2014, pp. 1-6.

[SA:93] M. Sharma and N. Arora, OPTIMA: A Nonlinear Model Extraction Program with Statistical Confidence Region Algorithms, *IEEE Transactions on CAD,* 12(7), August 1993, pp. 982-987.

[SH:68] H. Shichman and D. Hodges, Modeling and Simulation of Insulated-Gate Field Effect Transistor Switching Circuits, *IEEE Journal of Solid-State Circuits,* SC-3, 1968.

[Sim:84] G. Simmons, A System for Verifying User Identity and Authorization at Point-of-Sale or Access, *Cryptologica,* 8(1), 1984, pp. 1-21.

[Sim:91] G. Simmons, Identification of Data, Devices, Documents and Individuals, in proc. *IEEE International Carnahan Conference on Security Technology,* 1991, pp. 197-218.

[Sko:08a] B. Škorić, On the Entropy of Keys Derived from Laser Speckle; Statistical Properties of Gabor-transformed Speckle, *Journal of Optics A: Pure and Applied Optics,* 10(5):055304-05516, 2008.

[Sko:08b] B. Škorić, T. Bel, A. H. M. Blom, B. R. de Jong, H. Kretschman, and A. J. M. Nellissen, Randomized Resonators as Uniquely Identifiable Anti-counterfeiting Tags, in proc. *Secure Component System Identification Workshop,* Berlin, March 2008.

[Sko:09] B. Škorić, Quantum Readout of Physical Unclonable Functions: Remote Authentication Without Trusted Readers and Authenticated Quantum Key Exchange Without Initial Shared Secrets, *Cryptology ePrint Archive,* Report 2009/369, July 2009, https://eprint.iacr.org/2009/369, (last accessed Mar. 21, 2021).

[SZL+:09] N. Sultana, W. Zhou, T. P. LaFave, Jr., and D. L. MacFarlane, HBr Based ICP Etching of High Aspect Nanoscale Trenches in InP: Considerations for Photonic Applications, *Journal of Vacuum Science Technology, B* 27(2351), 2009.

[Tho:20] M. A. Thornton, Introduction to Quantum Computation Reliability, in proc. *IEEE International Test Conference,* November 2020, pp. 1-10.

[TM:19] M. A. Thornton and D. L. MacFarlane, Quantum Photonic TRNG with Dual Extractor, in proc. *Workshop on Quantum Technology and Optimization Problems,* March 2019, pp. 171-182.

[TS+:05] P. Tuyls, B. Škorić, S. Stallinga, A. H. M. Akkermans, and W. Ophey, Information-Theoretic Security Analysis of Physical Unclonable Functions, *Financial Cryptography,* 2005.

[YC:07] J. Yang and L. Chen, A New Loadless 4-Transistor SRAM Cell with a 0.18 µm CMOS Technology, in proc. *Canadian Conference on Electrical and Computer Engineering,* 2007, pp. 538-541.

[ZSM:08] W. Zhou, N. Sultana, and D.L. MacFarlane, HBr-Based Inductively Coupled Plasma Etching of High Aspect Ratio Nanoscale Trenches in GaInAsP/InP, *Journal of Vacuum Science Technology, B* 26 (1896), 2008.

What is claimed is:

1. A hybrid PUF system, comprising:
a Physical Unclonable Function (PUF) adapted to generate a unique signature associated with the PUF system, wherein the signature has a bit width, the PUF comprising:
a photon source;
a component chain adapted to operate as splitter and having an input coupled to the photon source and an output, the component chain including a composite splitter comprising a Y splitter, a first 4-port coupler coupled to an output of the Y splitter, and a second 4-port coupler coupled to an output of the first 4-port coupler, wherein;
a photodetector coupled to the output of the component chain, wherein the output of the component chain comprises a first output and a second output and the photodetector comprises a first photodetector coupled to the first output of the component chain and a second photodetector coupled to the second output of the component chain;
a differential amplifier having a first input coupled to an output of the first photodetector and a second input coupled to an output of the second photodetector, wherein a value for a bit of the bit width of the signature of the PUF is based on the output of the component chain, an output of the photodetector and an output of the differential amplifier; and challenge and response logic adapted to determine a response to a challenge, wherein a value of the response is based on a value of the signature generated by the PUF and a value of the challenge, the challenge and response logic comprising electronic circuitry wherein the challenge and response logic comprises:
- a inverter with an input coupled to the output of the differential amplifier;
- a SR latch having a first input coupled to an output of the inverter and a second input coupled to the output of the differential amplifier; and
- a multiplexer having a first input coupled to a first output of the SR latch and a second input coupled to a second output of the SR latch, wherein the multiplexer is adapted to be selected based on the value of the challenge and the value of a bit of the response is based on an output of the multiplexer.

2. The PUF system of claim 1, wherein the splitter is a 3 db splitter.

3. The PUF system of claim 1, wherein the photon source comprises a photon pump and the hybrid PUF system is adapted to operate a classical domain.

4. The PUF system of claim 1, wherein the photon source comprises a single photon source and the hybrid PUF system is adapted to operate in a quantum domain.

5. The PUF system of claim 1, wherein the challenge and response logic comprises the inverter, the SR latch, and the multiplexer for each bit of a bit width of the response.

6. The PUF system of claim 5, wherein the bit width of the response is the same as the bit width of the signature.

7. The PUF system of claim 6, wherein the multiplexer is adapted to be selected based on the value of a corresponding respective bit of the challenge value.

8. The PUF system of claim 1, further comprising level shifting logic disposed between the output of the differential amplifier and the input of the inverter and between the output of the differential amplifier and the SR latch.

9. A method, comprising:
generating a unique signature associated with a system, wherein the signature has a bit width, by:
producing a photon from a photon source;
providing the photon to a component chain, the component chain having a plurality of coupled optical components including a composite splitter comprising a Y splitter, a first 4-port coupler coupled to an output of the Y splitter, and a second 4-port coupler coupled to an output of the first 4-port coupler; and
determining a value for a bit of the bit width of the unique signature based on the output of the component chain.

10. The method of claim 9, wherein the output of the component chain comprises a first output and a second output and a first photodetector is coupled to the first output of the component chain and a second photodetector is coupled to the second output of the component chain, and the value for the bit of the bit width of the unique signature is determined by taking a difference between an output of the first photodetector and an output of the second photo detector.

11. The method of claim 9, wherein the value for the bit of the bit width of the unique signature is based on the output of a photodetector coupled to the output of the component chain.

12. The method of claim 9, wherein the component chain is adapted to operate as a splitter.

13. The method of claim 12, wherein the splitter is a 3 db splitter.

14. The method of claim 9, wherein the photon source comprises a photon pump and the system is adapted to operate in a classical domain.

15. The method of claim 9, wherein the photon source comprises a single photon source and the system is adapted to operate in a quantum domain.

16. The method of claim 9, further comprising determining a response to a challenge, wherein a value of the response is based on a value of the unique signature and a value of the challenge.

17. The method of claim 16, wherein the challenge and response logic comprises electronic circuitry.

18. The method of claim 16, wherein the challenge and response logic comprises:
- a inverter with an input coupled to the output of the differential amplifier;
- a SR latch having a first input coupled to an output of the inverter and a second input coupled to the output of the differential amplifier; and
- a multiplexer having a first input coupled to a first output of the SR latch and a second input coupled to a second output of the SR latch, wherein the multiplexer is adapted to be selected based on the value of the challenge and the value of a bit of the response is based on an output of the multiplexer.

19. The method of claim 18, wherein the challenge and response logic comprises the inverter, the SR latch, and the multiplexer for each bit of a bit width of the response.

20. The method of claim 19, wherein the bit width of the response is the same as the bit width of the signature.

* * * * *